United States Patent
Nachimuthu et al.

(10) Patent No.: US 10,958,990 B2
(45) Date of Patent: Mar. 23, 2021

(54) TRUSTED PLATFORM TELEMETRY MECHANISMS INACCESSIBLE TO SOFTWARE

(71) Applicant: Intel Corporation, Santa Clara, CA (US)

(72) Inventors: Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 813 days.

(21) Appl. No.: 15/585,936

(22) Filed: May 3, 2017

(65) Prior Publication Data

US 2018/0324052 A1 Nov. 8, 2018

(51) Int. Cl.
*H04L 12/24* (2006.01)
*H04Q 9/00* (2006.01)

(52) U.S. Cl.
CPC .......... *H04Q 9/00* (2013.01); *H04L 41/5009* (2013.01)

(58) Field of Classification Search
CPC ....... H04Q 9/00; H04L 41/5009; H04L 67/12; H04L 67/26; H04L 67/10; H04L 63/1425; G06F 9/44521; G06F 9/45504; G06F 9/546; G06F 12/023; G06F 21/71; G06F 2209/548; G06F 21/50
See application file for complete search history.

(56) References Cited

U.S. PATENT DOCUMENTS

| | | | | |
|---|---|---|---|---|
| 9,740,876 | B1* | 8/2017 | Nachenberg | G06F 21/6218 |
| 2006/0116557 | A1* | 6/2006 | Moore | A61B 5/0002 600/300 |
| 2014/0247140 | A1* | 9/2014 | Proud | H02J 50/80 340/870.02 |
| 2015/0106912 | A1* | 4/2015 | Brandon | H04Q 9/00 726/13 |
| 2016/0182345 | A1* | 6/2016 | Herdrich | G06F 12/084 709/224 |
| 2016/0226913 | A1* | 8/2016 | Sood | H04Q 9/00 |
| 2016/0335151 | A1* | 11/2016 | Swierk | G06F 21/50 |
| 2016/0378686 | A1* | 12/2016 | Adams | G06F 9/4401 713/2 |
| 2017/0250892 | A1* | 8/2017 | Cooper | G06F 21/552 |

(Continued)

*Primary Examiner* — Alina A Boutah
(74) *Attorney, Agent, or Firm* — Compass IP Law PC

(57) ABSTRACT

Trusted platform telemetry mechanisms and associated methods, apparatus, and firmware components. Trusted telemetry mechanisms are provided for securely collecting platform telemetry data from telemetry data sources on a compute platform, such as machine specific registers (MSRs), device registers, system management bus (SMBus) and memory controllers. The telemetry data is collected from the telemetry data sources using various mechanisms, and securely stored on the compute platform in a manner that is inaccessible to software running on the compute platform. A submission queue and completion queue model may also be implemented to facilitate collection of telemetry data. In addition, a memory-mapped input-output (MMIO) aliasing scheme is provided to facilitate collection of telemetry data from platform telemetry data sources using various access mechanisms.

29 Claims, 12 Drawing Sheets

(56) References Cited

U.S. PATENT DOCUMENTS

| | | | |
|---|---|---|---|
| 2018/0026835 A1* | 1/2018 | Nachimuthu | G06F 3/0683 |
| | | | 717/172 |
| 2018/0074973 A1* | 3/2018 | Chan | G06F 11/00 |
| 2018/0098136 A1* | 4/2018 | Krithivas | H04Q 9/00 |
| 2018/0150256 A1* | 5/2018 | Kumar | G06F 9/505 |
| 2018/0172419 A1* | 6/2018 | Romano | G01B 7/003 |
| 2018/0176663 A1* | 6/2018 | Damaggio | H04L 41/0806 |
| 2018/0262407 A1* | 9/2018 | Biswas | H04L 43/065 |

* cited by examiner

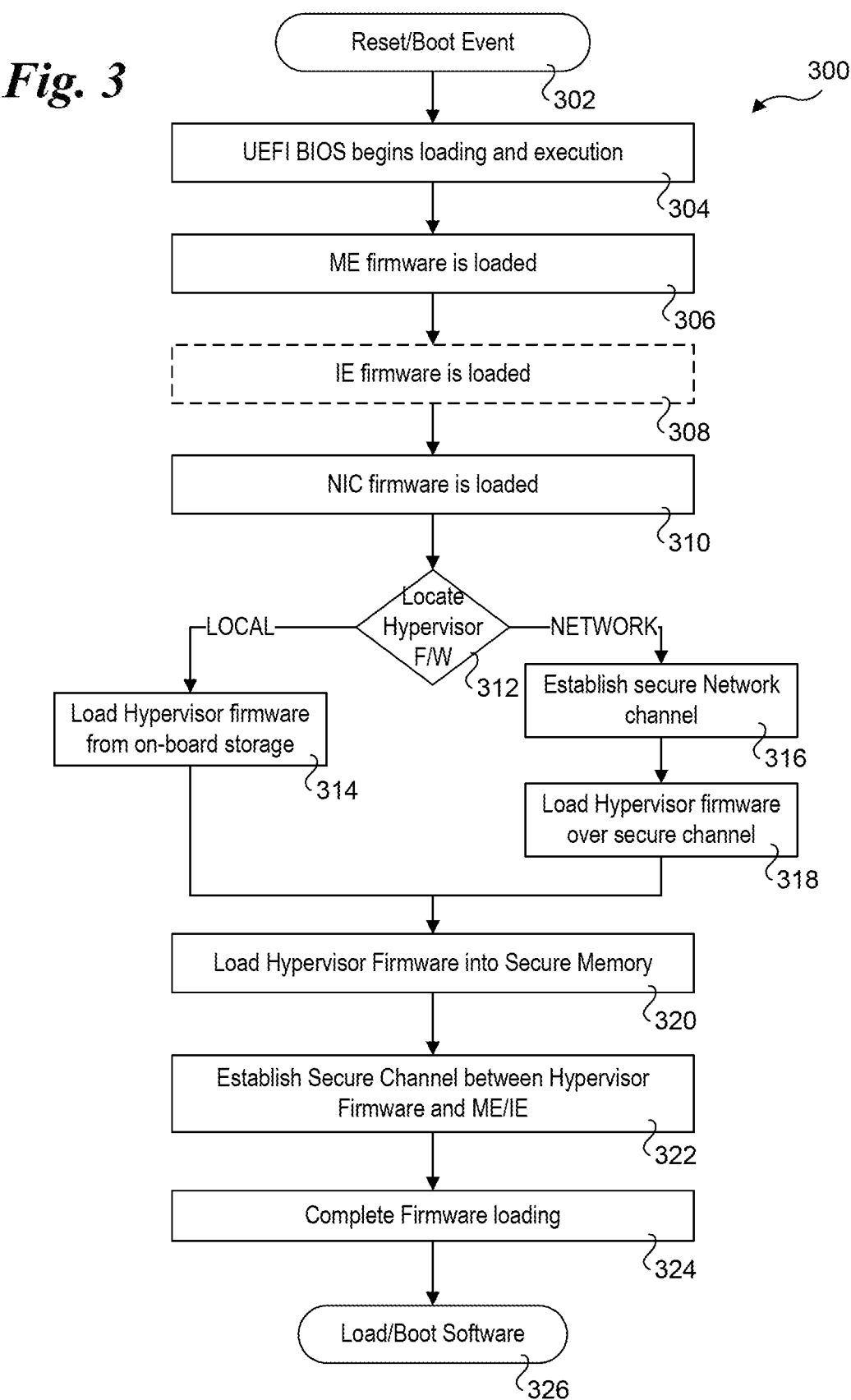

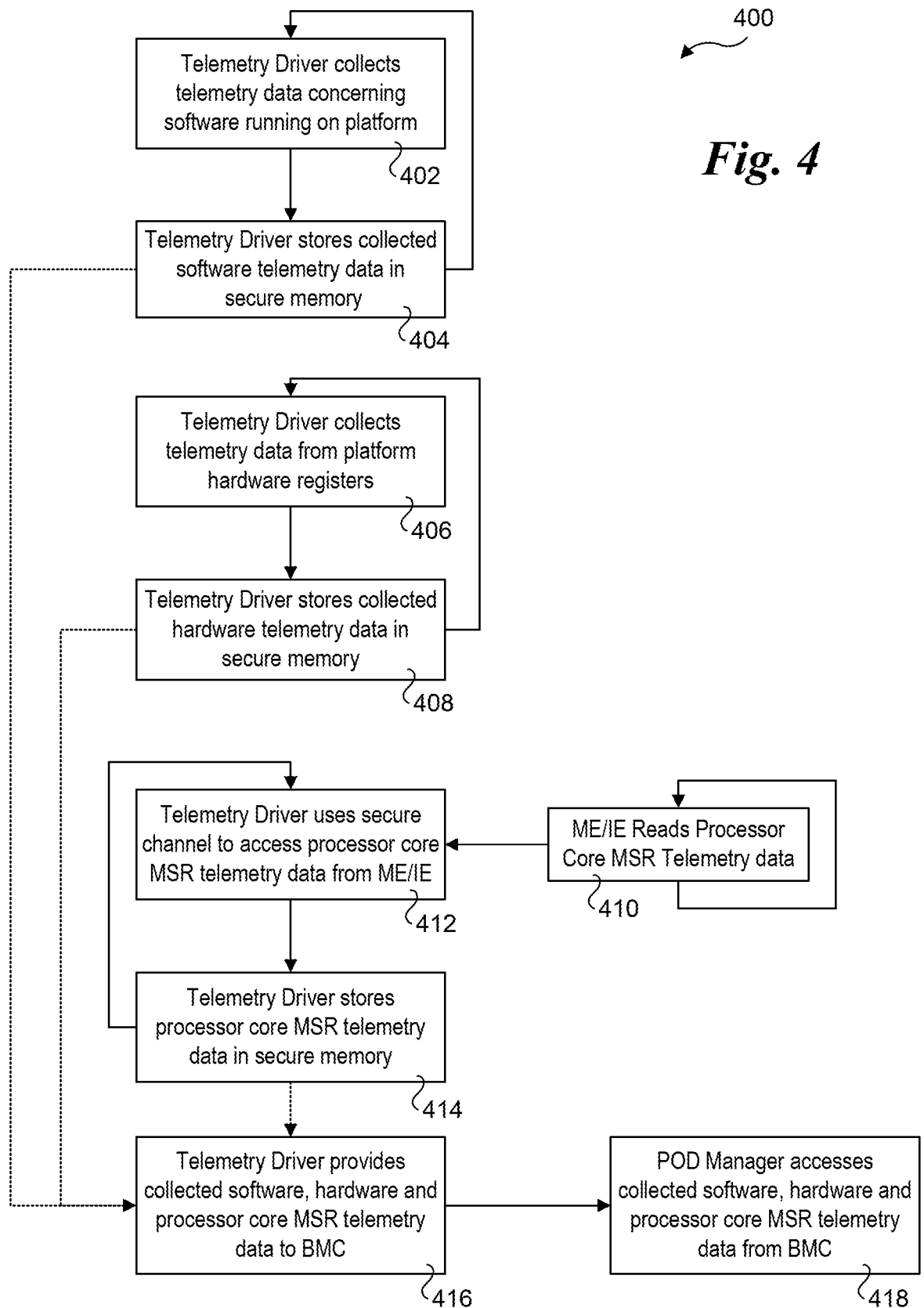

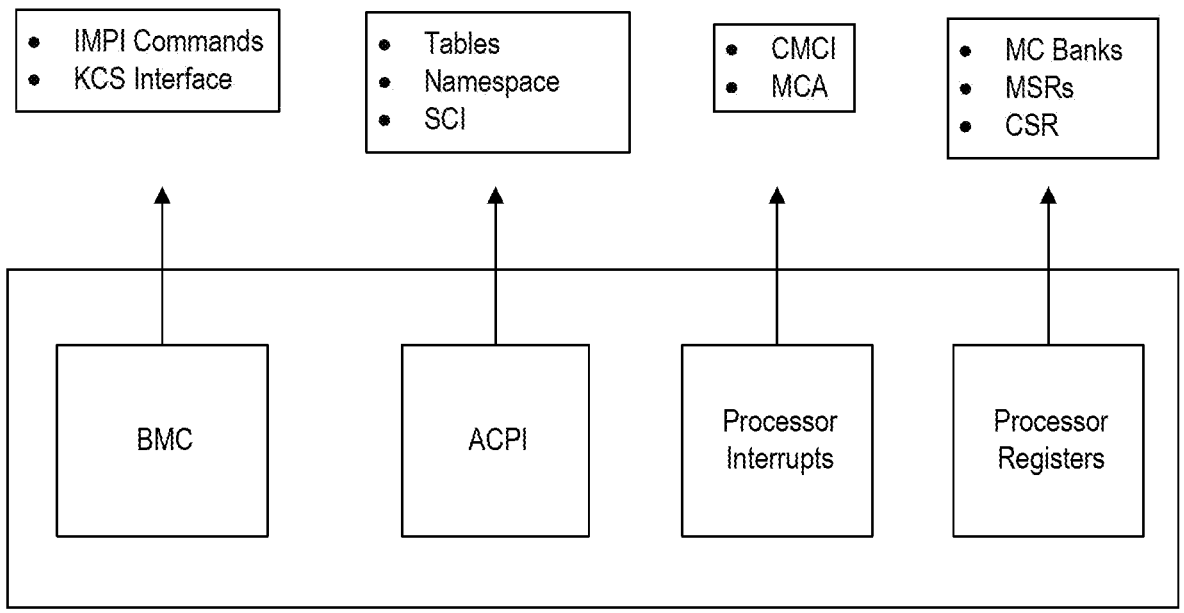
Fig. 5 *(prior art)*
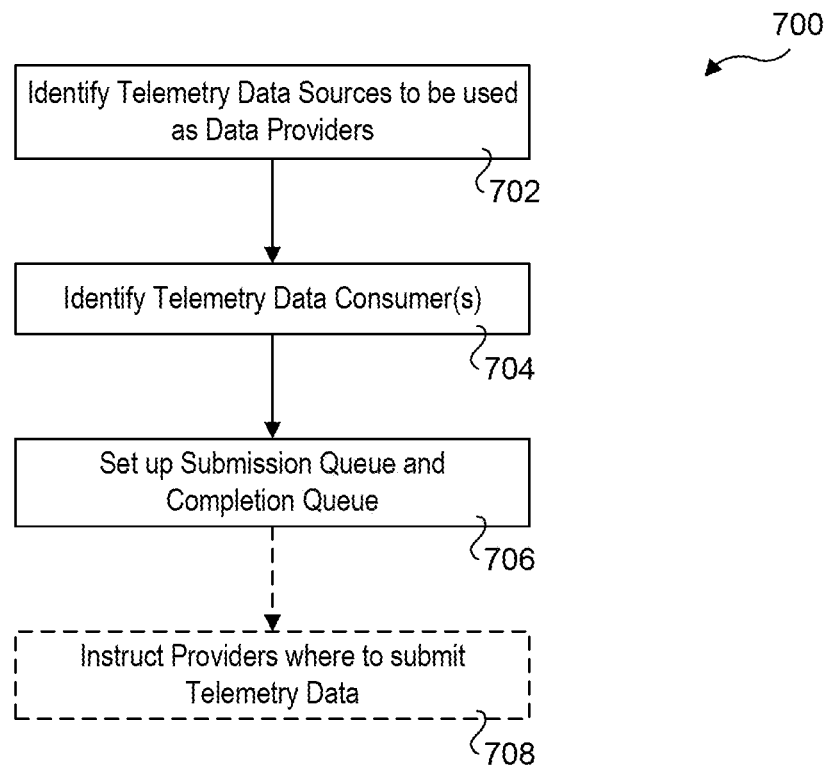
Fig. 7

TRUSTED PLATFORM TELEMETRY MECHANISMS INACCESSIBLE TO SOFTWARE

BACKGROUND INFORMATION

Increases in processor speeds, memory, storage, and network bandwidth technologies have resulted in the build-out and deployment of networks with ever increasing capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services that employ private network infrastructure.

Cloud-based services are typically facilitated by a large number of interconnected high-speed servers, with host facilities commonly referred to as server "farms" or data centers. These server farms and data centers typically comprise a large-to-massive array of rack and/or blade servers housed in specially-designed facilities. Many of the larger cloud-based services are hosted via multiple data centers that are distributed across a geographical area, or even globally. For example, Microsoft Azure has multiple very large data centers in each of the United States, Europe, and Asia. Amazon employs co-located and separate data centers for hosting its EC2 and AWS services, including over a dozen AWS data centers in the US alone.

In order to more effectively manage data center resources, telemetry data concerning various data center resources is collected and analyzed, which is referred to as data center analytics or cloud analytics. An example of telemetry data is the amount of L2/L3 cache consumed on a processor, which can reveal much more detailed information regarding processor (and platform) utilization and usage than conventional CPU utilization measurements. Telemetry data is also used to verify performance metrics in service level agreements (SLAs) when data center resources are leased, such as for Infrastucture as a Service (IaaS) SLAs.

The current approach is to use software to collect telemetry data. For example, modern operating systems provide means for accessing various processor performance data, memory utilization, processes, threads, etc. This is facilitated by software code running in memory on a host system, which is inherently untrustworthy, since such code can be easily manipulated and/or hacked. For example, a cloud service provider could modify telemetry data to meet SLA requirements, and there would be little way for a customer to refute the data. It would be advantageous to be able to ensure telemetry data is both accurate and trustworthy.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a flowchart illustrating operations and logic performed in configuring a secure telemetry mechanism implemented in firmware, according to one embodiment;

FIG. 4 is a flowchart illustrating operations for acquiring telemetry data via a firmware-based telemetry driver and forwarding the telemetry data to a POD manager, according to one embodiment;

FIG. 5 is a block diagram illustrating a convention scheme for accessing telemetry data and the providers of the telemetry data;

FIG. 7 is a flowchart illustrating operations for setting up a submission queue and a completion queue in accordance with the embodiment of FIG. 6;

DETAILED DESCRIPTION

Figure 1:
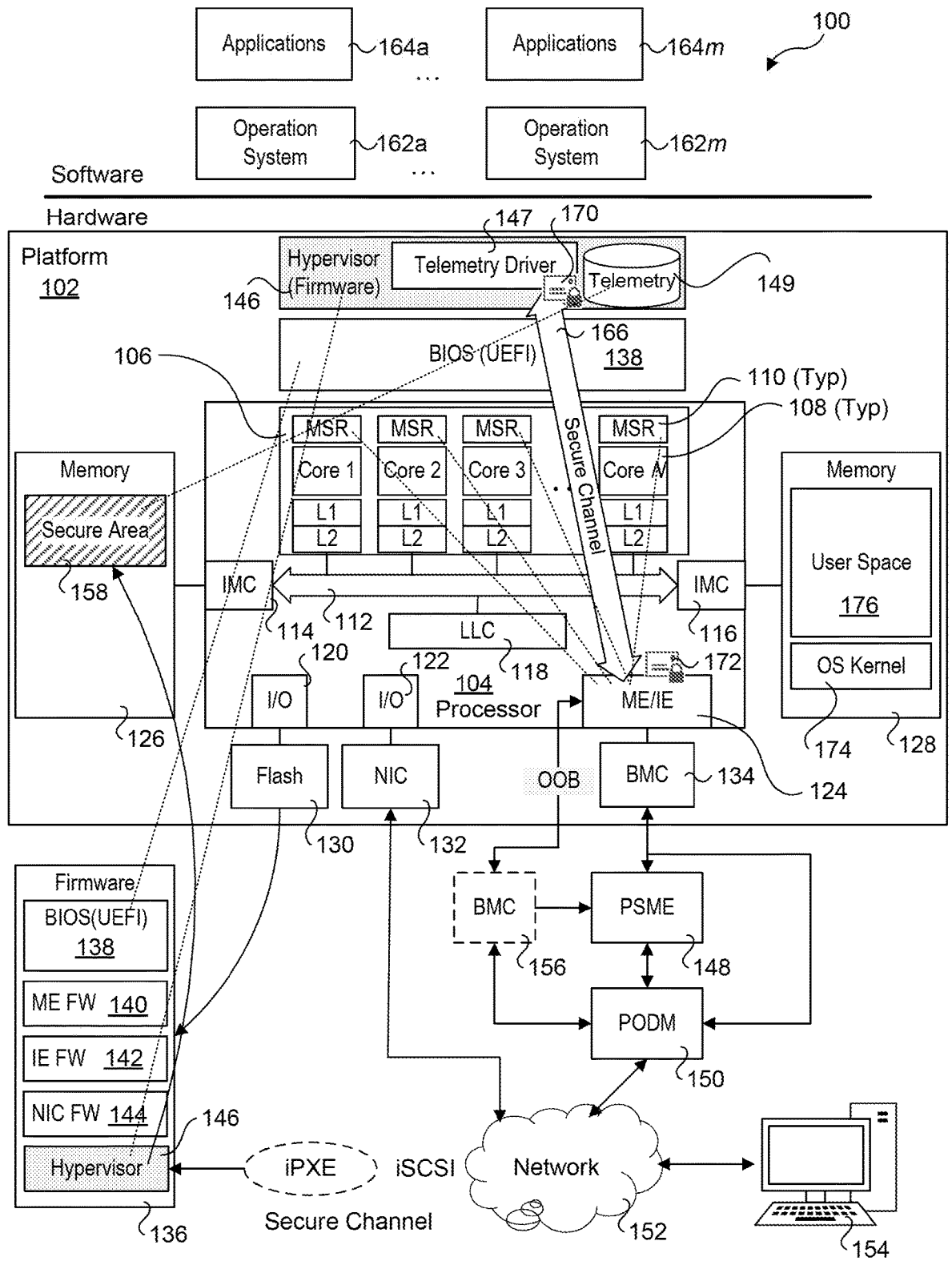
FIG. 1 is a schematic diagram illustrating an architecture for a secure mechanism for performing telemetry measurements using a firmware-based component, according to one embodiment.

Embodiments of trusted platform telemetry mechanisms and associated methods, apparatus, and firmware components are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of embodiments disclosed herein, mechanisms for secure collection of platform telemetry data on compute platforms are disclosed. The mechanisms are implemented through use of trusted firmware components in combination with secure communication channels. The mechanisms are also transparent to software running on the compute platform, and are configured such that they cannot be tampered with using software or subject to external threats, such as hacking via network access to the compute platform.

FIG. 1 shows an architecture 100 including provisions for implementing a trusted telemetry mechanism, according to one embodiment. Architecture 100 includes a compute platform 102 including various hardware and firmware components displayed in the portion of the diagram below the Software/Hardware division bar including a processor 104. Processor 104 includes a processor core 106 including N processor cores 108 (also depicted as Core 1 . . . Core N). Each processor core 108 includes a set of machine specific registers (MSRs) 110, and a Level 1 (L1) cache, and a Level 2 (L2) cache. Each processor core 108 is coupled to a coherent interconnect 112 to which a pair of integrated memory controllers (IMCs) 114 and 116 and a last level cache (LLC) 118 are coupled. Processor 104 further is depicted as including input/output (I/O) interfaces 120 and 122, and a manageability component comprising a manageability engine/innovation engine (ME/IE) 124.

Architecture 100 further depicts memory address spaces 126 and 128 allocated in corresponding memory devices, such as DDR4 or DDR5 Dual Inline Memory Modules (DIMMs) coupled to IMC 114 and 116, a non-volatile flash storage device 130, a network interface controller (NIC) 132, and a baseboard management controller (BMC) 134. Various platform firmware 136 components are stored in flash storage device 130, including Universal Extensible Firmware Interface (UEFI) firmware including BIOS (Basic Input Output System) 138, manageability engine firmware 140, innovation engine firmware 142, NIC firmware 144, and hypervisor firmware 146. As further shown, hypervisor firmware 146 includes a telemetry driver 147 that is used to generate telemetry data 149.

Compute platform 102 is further shown as being connected to various system components including a Pooled System Management Engine (PSME) 148 and a POD manager (PODM) 150. Generally, BMC 134 may be connected to PSME 148 and/or POD manager 150. In one embodiment under which BMC 134 is connected to PSME 148, PSME 148 facilitates communication between BMC 134 and POD manager 150. POD manager, in turn, is connected to a network 152 that facilitates communication between the various system components and a remote management station 154. NIC 132 is also coupled to network 152.

For simplicity and to reduce clutter, network 152 is shown as a single cloud; however, network 152 is illustrative of one or more networks that may use the same technology and protocols, or different technologies and protocols. For example, some components in the system, such as BMC 134, PSME 148, and POD manager 150 may employ a network that is separate from the network accessed by NIC 132. In one embodiment, the network used by BMC 134, PSME 148, and POD manager 150 is a private network that is not accessible to software running on the compute platform.

Under an optional configuration, a platform may not include a BMC, but rather the BMC is external to the platform, such as depicted by an external BMC 156. In one embodiment, external BMC 156 is connected to ME/IE 124 via an out-of-band (OOB) communication channel. Optionally, a BMC may be connected to a platform using a network connection.

During platform initialization, as described below, firmware code including hypervisor 146 will be loaded into a secure area of the platform's memory address space that is not exposed to any software running on the platform, such as depicted by secure area 158 in memory address space 126. For illustrative purposes, memory address spaces 126 and 128 are shown as separate address spaces since they are shown coupled to IMCs 114 and 116. However, in practice, the physical memory address spaces that are used to access the memory devices coupled to IMCs 114 and 116 are mapped to one or more virtual address spaces. As further shown, memory address space 128 is depicted as including an OS kernel 174 and user space 176 in which use applications are run.

Following platform hardware initialization, software such as an operating system, is booted, and portion(s) of the virtual memory address space are exposed to the software. The portion(s) of the virtual memory address space that are exposed do not include secure area 158, and thus the software is not aware of the existence of this address space. Furthermore, under some embodiments, processor 104 is configured to prevent access to secure area 158 by any non-privileged firmware or software.

Figure 1A:
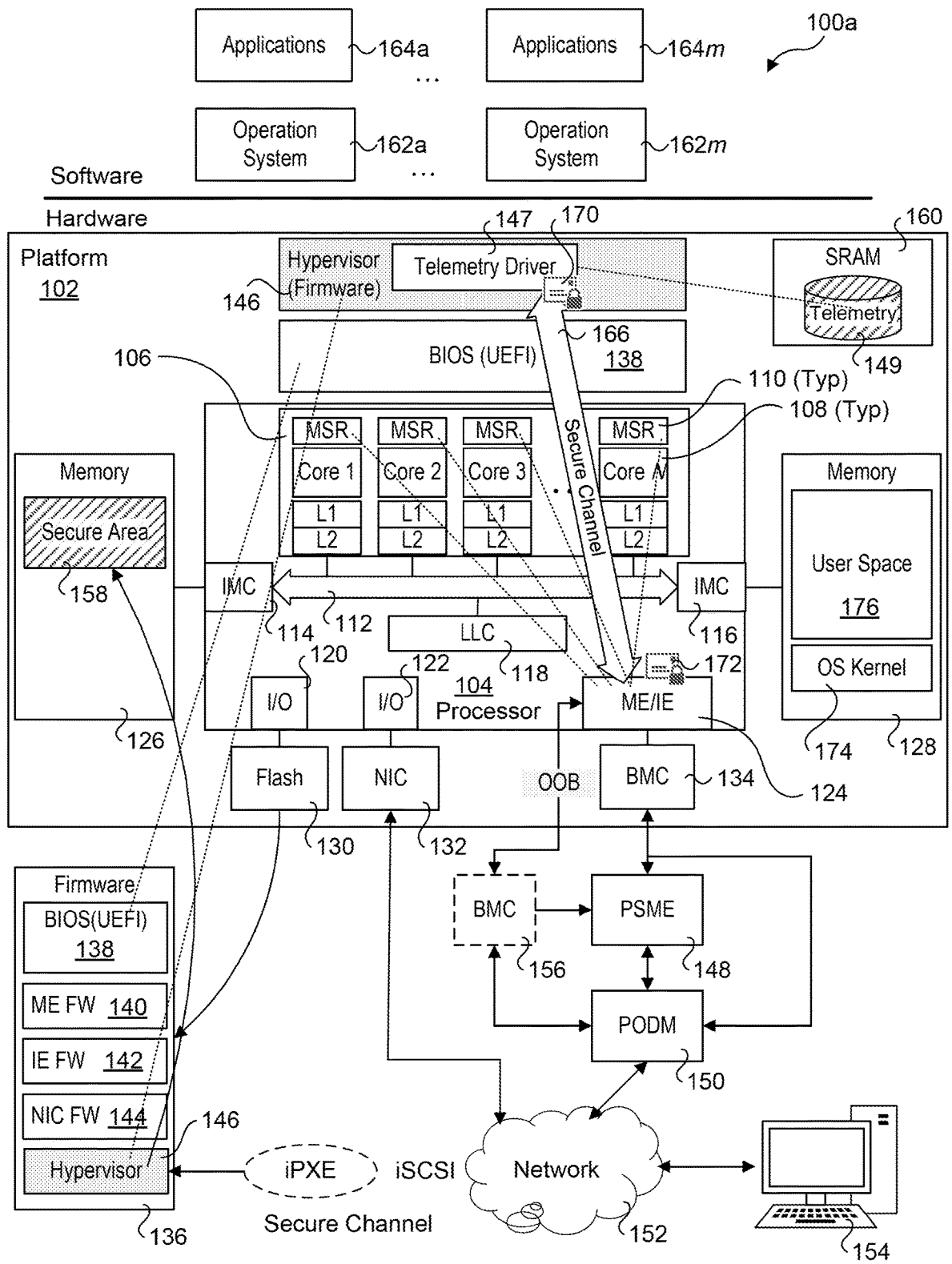
FIG. 1a is a schematic diagram illustrating an augmentation to the architecture of FIG. 1 under which the telemetry data is stored in SRAM.

Under an optional configuration illustrating an architecture 100a in FIG. 1a, all or a portion of telemetry data 149 is stored in SRAM 160. As before, the memory address space of SRAM 160 is not exposed to any software running on platform hardware 102, and thus is secure from access by the platform's software. In another configuration all or a portion of the telemetry data is stored in a set of registers included as part of the platform hardware.

Figure 2A:
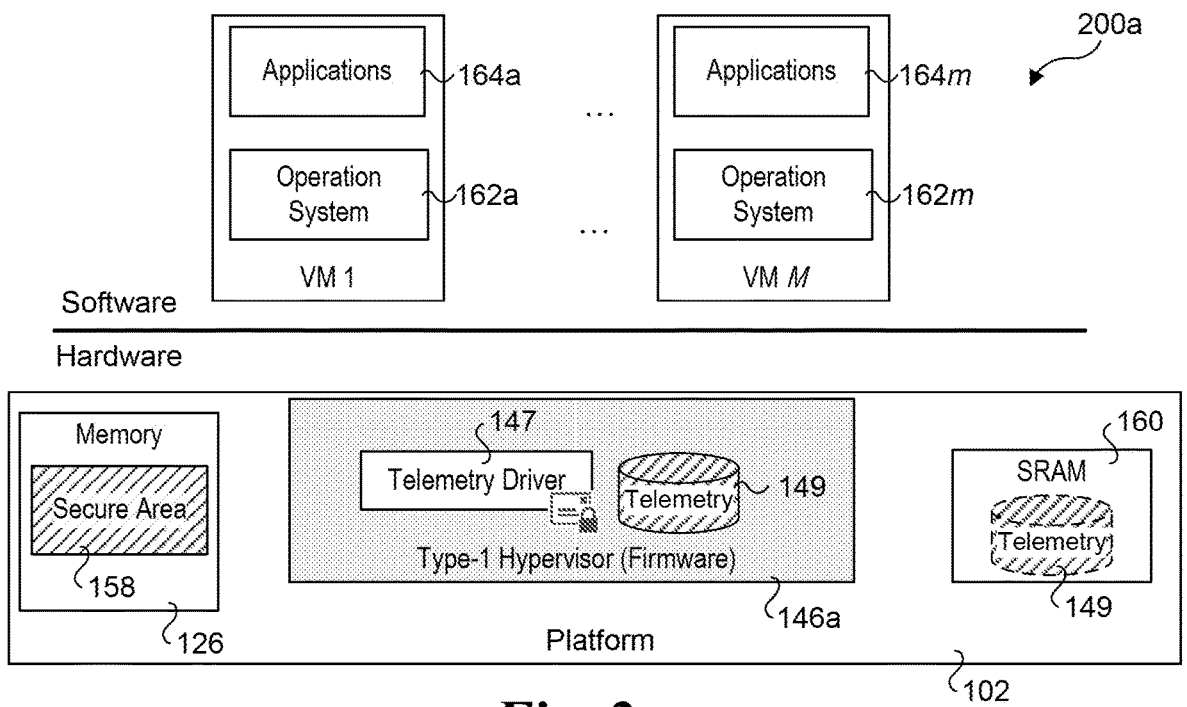
FIG. 2a is a block diagram illustrating a first configuration under which a telemetry driver is part of a type-1 hypervisor implemented in firmware.

Compute platform 102 is further configured to host various software components, depicted as m operating systems 162a . . . 162m, each running respective applications 164a . . . 164m. Generally, the operating systems may run on the platform hardware natively, or run on virtual machines (VMs) or containers. In one embodiment shown in FIG. 2a as firmware/software architecture 200a, hypervisor firmware 146a is configured as a Type-1 hypervisor that is used to host a plurality of virtual machines VM 1 . . . VM M Under a conventional approach, the functionality for a Type-1 hypervisor would be implemented in a software layer. However, under firmware/software architecture 200a, the Type-1 hypervisor functionality is implemented in a firmware layer.

Figure 2B:
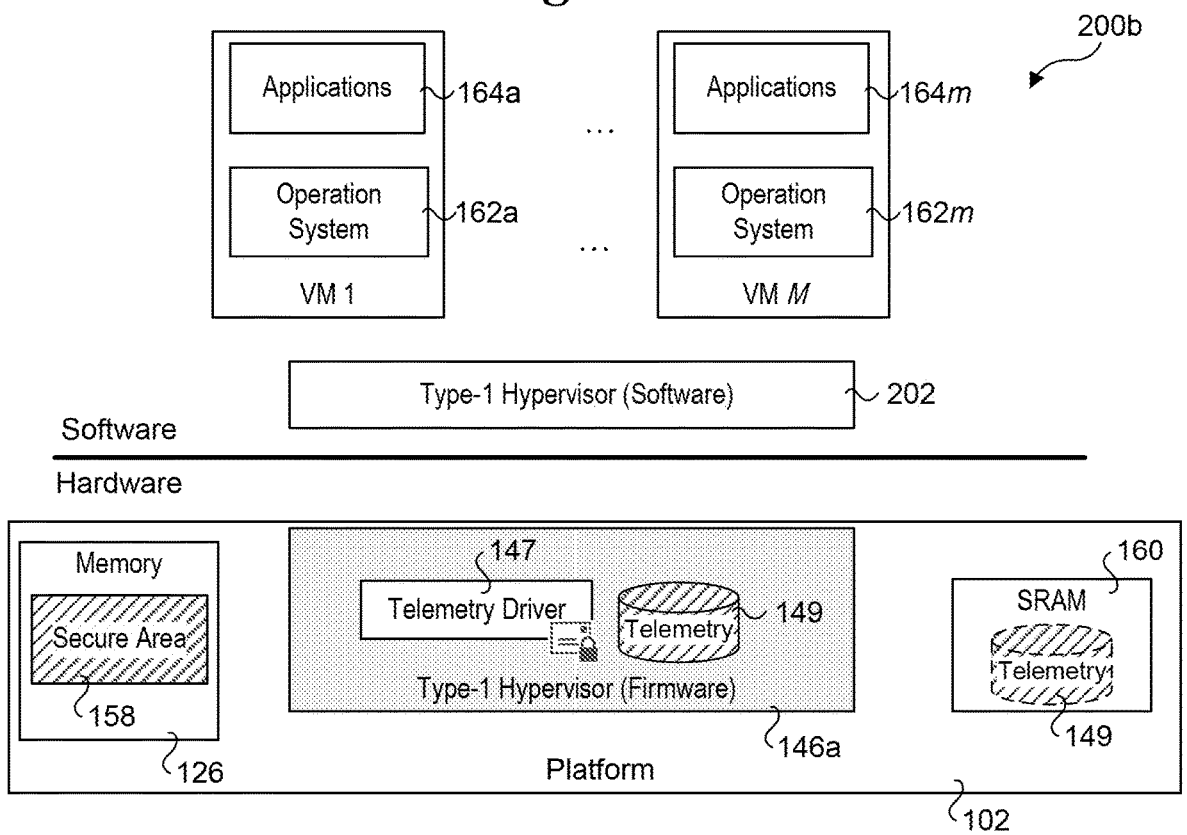
FIG. 2b is a block diagram illustrating a second configuration under which a telemetry driver is implemented in the firmware part of a split type-1 hypervisor implemented via a combination of firmware and software.
Figure 2C:
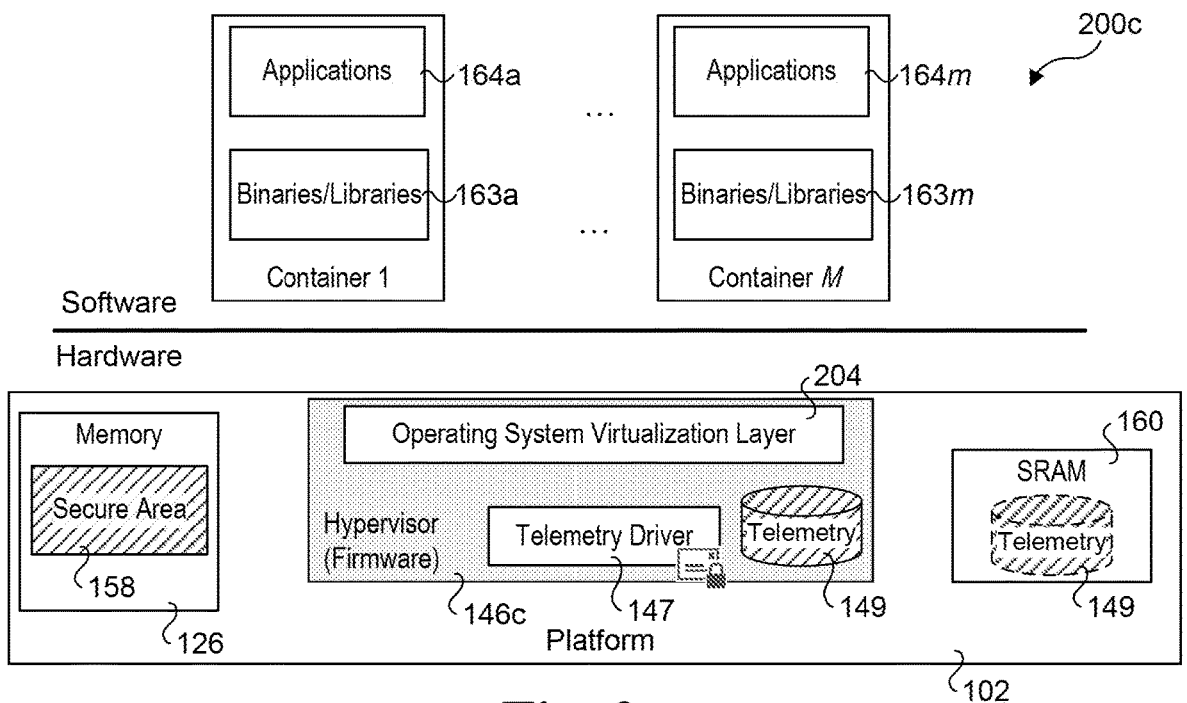
FIG. 2c is a block diagram illustrating a third configuration under which a telemetry driver is part of an operating system virtualization layer implemented in firmware.
Figure 2D:
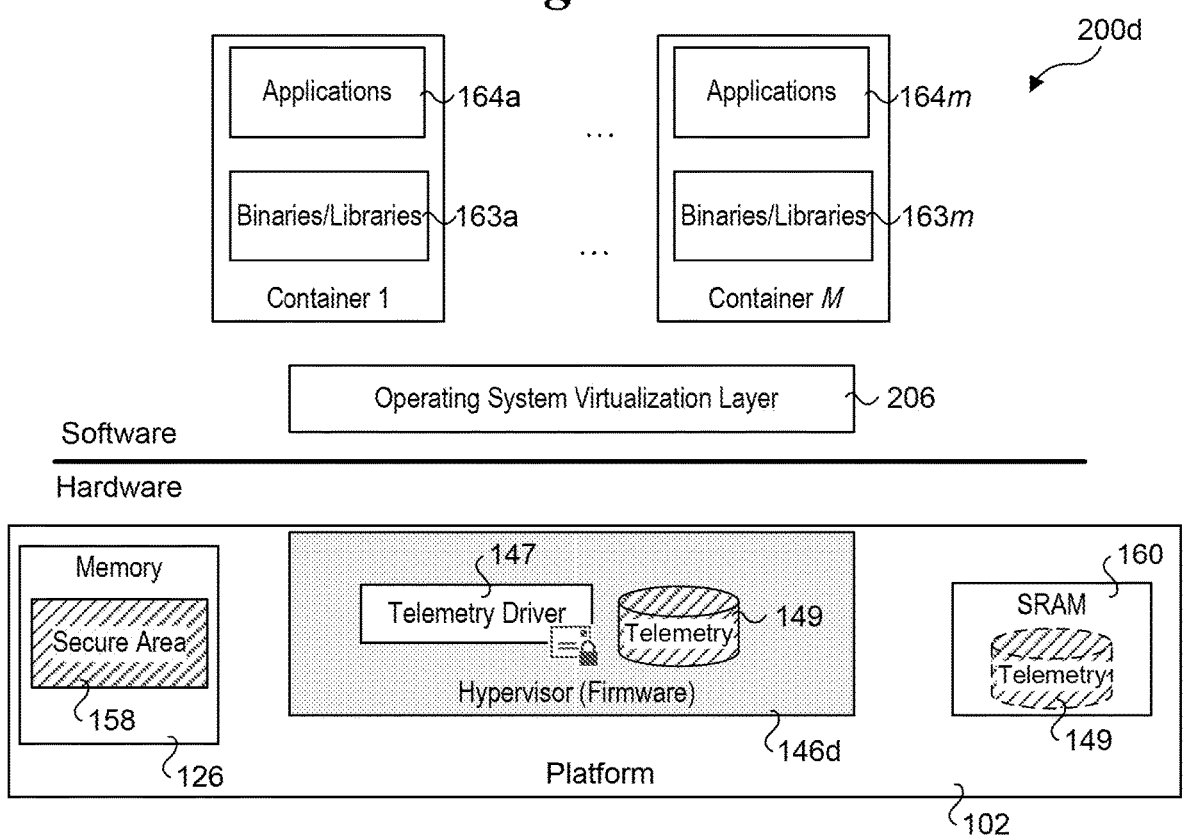
FIG. 2d is a block diagram illustrating a fourth configuration under which a telemetry driver is implemented in the firmware part of a split operating system virtualization layer implemented via a combination of firmware and software.

Under a firmware/software architecture 200b shown in FIG. 2b, the Type-1 hypervisor functionality is split between Type-1 hypervisor firmware 146b and Type-1 hypervisor software 200a. In this embodiment, the telemetry driver 147 is still implemented in the firmware portion of the hypervisor, and hypervisor software 202 is implemented as an abstraction layer that can pass data down to hypervisor firmware 146b, but cannot access data in secure memory area 158. Optionally, if telemetry data 149 is stored in SRAM 160, hypervisor software 202 is likewise prevented from accessing Other embodiments support container-based software execution environments, under which applications are executed in containers. The use of container-based execution environments has recently seen widespread adoption in data centers, such as containers based on Docker. (It is noted that other container-based implementation that do not use Docker may also be deployed.) Two exemplary embodiments of container-based software execution environments are shown in firmware/hardware architecture 200c of FIG. 2c and firmware/hardware architecture 200d of FIG. 2d. In firmware/hardware architecture 200c, hypervisor firmware 146c includes an operating system virtualization layer 204 that is configured to implement multiple containers, depicted as container 1 . . . container M. Under firmware/hardware architecture 200d, an operating system virtualization layer 206 is implemented in software as an abstraction layer that sits above hypervisor firmware 146d. Although shown as a single layer for convenience, an OS virtualization layer may comprise multiple layered components in some embodiments, such as an operating system kernel and a virtualization layer that sits above the OS kernel. For example, under the Docker architecture, a Docker layer sits between a host OS and the containers. Under both embodiments in FIGS. 2c and 2d, each container includes a set of binary executables and libraries (Binaries/Libraries) 163 that is used to facilitate execution of one or more applications 164 within the container.

In another embodiment (not shown), implementation of the operating system virtualization layer functionality is split between a firmware component and a software component. Under both firmware/hardware architectures 200c and 200d, all software components are prevented from accessing secure area 158 of memory address space 126 or, optionally, are presented from accessing telemetry data 149 in SRAM 160.

FIG. 3 shows a flowchart 300 illustrating operations and logic performed during platform initialization, according to one embodiment. The process starts with a platform reset or cold boot event as shown in a start block 302. In a block 304 the UEFI BIOS begins loading and executing. UEFI provides an extensible firmware interface that enables platform firmware to be extended beyond the basic BIOS code by means of UEFI firmware modules, including ME firmware 140, IE firmware 142 and NIC firmware 144. In block 306 ME firmware 140 is loaded. If an innovation engine is implemented, IE firmware 142 is loaded in a block 308. NIC firmware 144 is then loaded in a block 210.

Under alternative configurations, hypervisor firmware 146 may be stored on-board the compute platform, such as with other platform firmware stored in flash memory 130, or it may be securely loaded over network 152. As shown in a decision block 312, a determination is made to whether the hypervisor firmware is local or is to be loaded via a secure network channel. If the hypervisor firmware is stored locally, it is loaded from on-board storage in a block 314. If it is to be securely loaded over a network, a secure network channel is established in a block 316, and the hypervisor firmware is loaded over the secure network channel in a block 318. In one embodiment illustrated in FIG. 1, hypervisor firmware 146 is stored as an iPXE firmware image that is accessed from a network storage location. iPXE supports various load mechanisms, including accessing the iPXE firmware image from an iSCSI storage attached network (SAN). iPXE firmware images can also be loaded from a web server via HTTP, a Fibre Channel SAN via FCOE (Fibre Channel over Ethernet), and over an InfiniBand network. In one embodiment, the iPXE firmware image is encrypted, and a corresponding decryption key that is stored on the platform is used to decrypt the iPXE firmware image.

In a block 320 the hypervisor firmware is loaded into secure memory. For example, hypervisor firmware 146 would be loaded from flash memory 130 into secure memory 158 if stored locally, or, if stored in a network would be loaded over the network and loaded into secure memory 158.

In a block 322 the hypervisor firmware establishes a secure channel between itself and the ME/IE. This is depicted in FIG. 1 as a secure channel 166. In one embodiment the secure channel is established using credentials 170 and 172. In one embodiment, credentials 170 and 172 are stored in and retrieved from BMC 134. In addition to using a credential-based security scheme, various other well-known schemes may be used to establish secure channel 166, as will be recognized by those skilled in the art.

In a block 324 the platform firmware loading is completed, followed by loading software and/or booting one or more operating systems in an end block 326. For example, in the cases where hypervisor firmware 146 implements a Type-1 hypervisor, software for implementing one or more virtual machines would be loaded, followed by booting operating system images on the VMs. If hypervisor firmware 146 is configured to implement in an operating system virtualization layer, then corresponding container software is loaded, followed by loading and booting of operating system images that run in the containers.

FIG. 4 shows a flowchart 400 illustrating ongoing operations used to collect and securely forward telemetry data. As shown in blocks 402 and 404, the telemetry driver collects telemetry data concerning software running on the compute platform and stores the collected software telemetry data in secure memory. In parallel, the telemetry driver also collects telemetry data from platform hardware registers in a block 406 and stores the collected hardware telemetry data in secure memory in a block 408.

In a block 410 the ME/IE reads processor core MSR telemetry data. In a block 412 the telemetry driver uses the secure channel established with the ME/IE to access the MSR telemetry data from the ME/IE, and then stores the MSR telemetry data in secure memory in a block 414.

As illustrated by the loops depicted in FIG. 4, each of operations in blocks 402, 404, 406, 408, 410, 412, and 414 are generally performed on an ongoing basis. Periodically, or in response to a request for telemetry data, the telemetry driver provides the collected software, hardware, and processor core MSR telemetry data to the BMC, as shown in a block 416. Similarly, either periodically or on-demand, the POD managers access the collected software, hardware, and processor core MSR telemetry data from the BMC, as shown in a block 418.

Processor Telemetry Event Generation Using Submission, Completion Queue Model

As shown in FIG. 5, there are many sources of telemetry data in compute platforms today. However, there generally is no consolidation even at the RAS feature level on exposing telemetry information. Moreover, the information format may differ between platform generations. There is also a conflict of interest between the platform vendor and the operating system; for example, the OS wants to see every error, while vendors would like to abstract errors to avoid unnecessary support calls. As a result, the same telemetry features are exposed differently on different compute platforms.

In accordance with further aspects of embodiments disclosed herein, a submission and completion queue model is implemented under which queue commands are submitted to a submission queue, fetched from the submission queue and processed to generate and/or collect telemetry data. A completion queue is implemented in which completion queue entries are input including one or more of data identifying the queue commands, telemetry data generated and/or collected via processing of the queue commands, and a location of such telemetry data, while a consumer of the telemetry data reads the completion queue entries and accesses the telemetry data based on data in the completion queue entries.

Figure 6:
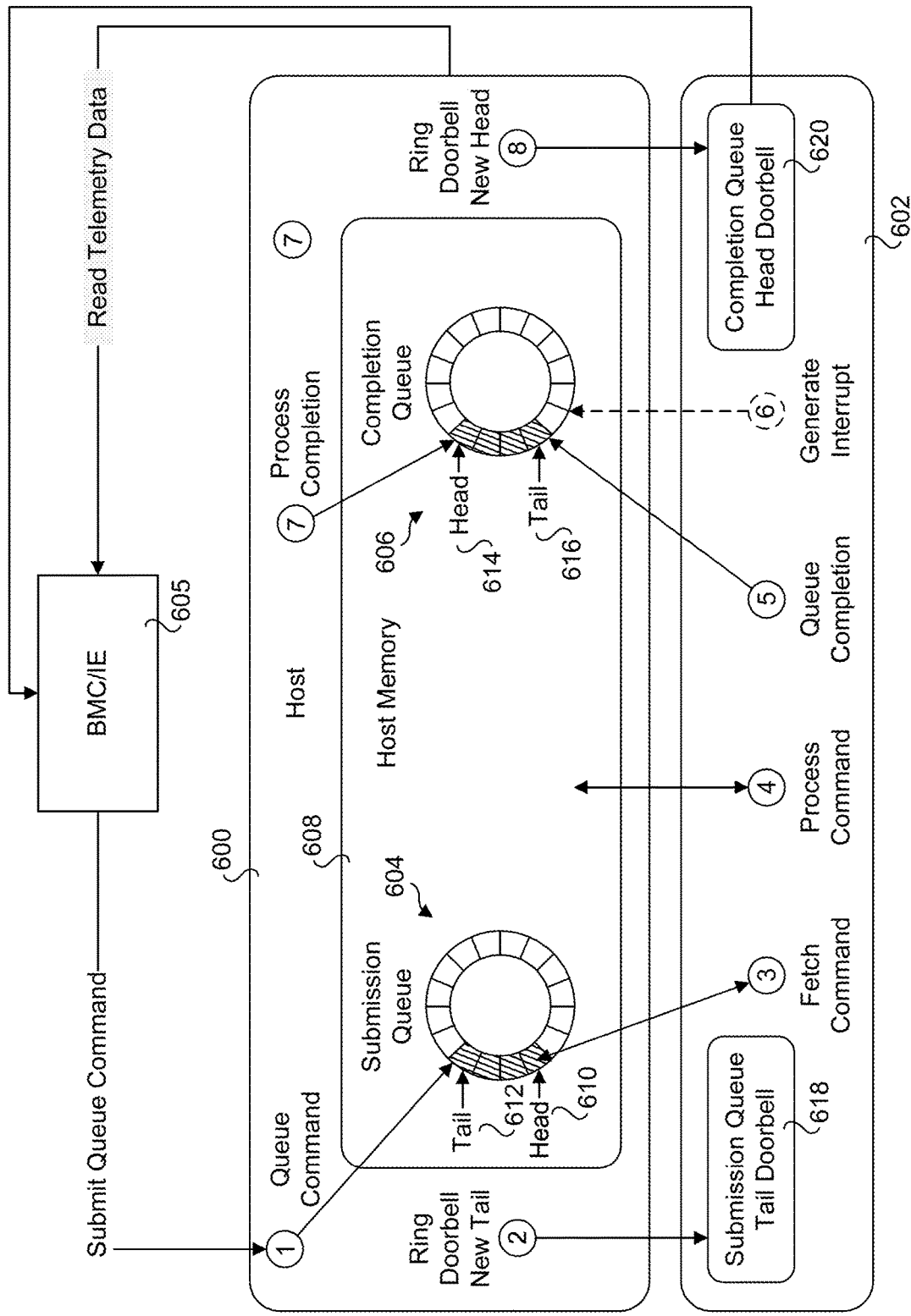
FIG. 6 is a combination architecture and flow diagram illustrating a telemetry data acquisition scheme employing a submission queue and a completion queue, according to one embodiment.

One embodiment of the submission and completion queue model is shown in FIG. 6. As illustrated, the model includes a host 600 and a queue change notification block 602. In the illustrated embodiment, each of a submission queue 604 and a completion queue 606 are implemented in host memory 608. However, this is merely exemplary, as the model may be implemented in other memory, such as SRAM 160. In the illustrated embodiment, submission queue 604 is implemented as a circular FIFO (First-In, first-Out) queue including a head pointer 610 and a tail pointer 612. Similarly, completion queue 606 is implemented as a circular FIFO queue including a head pointer 614 and a tail pointer 616.

As further illustrated by encircled numbers and associated operations, processing of telemetry data under the mechanism proceeds as follows. First, a queue command is submitted at the slot in submission queue 604 currently pointed to by tail pointer 612, and the tail pointer is advanced one slot. In the illustrated embodiment, the queue commands are submitted by BMC/IE 605 which represents either the BMC or IE; however, this is merely exemplary, as other management controllers or management entities on the host or in communication with the host can issue the queue commands.

The queue command identifies telemetry data that is to be generated and/or forwarded by one of the telemetry data providers. In a second operation, BMC/IE 605 rings the submission queue doorbell to inform the host hardware that a new queue command has been submitted to submission queue 604, as indicated by a submission queue tail doorbell 618. As depicted by a third operation, the host hardware (e.g., an IP block on the host, processor micro code or SMM) fetches a previously submitted queue command pointed to by head pointer 610, and the head pointer is advanced one slot. The queue command is then processed during a fourth operation by a telemetry data provider.

In one example, the BMC or IE asks the host hardware to provide memory bandwidth information at 10 second intervals in a particularly telemetry queue number (default could be common queue), the host hardware accepts the command and responds back indicating the command is successful if it can provide the requested operation. Subsequently, the host hardware starts streaming the memory bandwidth information to the telemetry queue number every 10 seconds.

In another example, the BMC or IE asks the host hardware to provide a notification in a telemetry queue number whenever a processor core temperature reaches a threshold, such as 85° C. (Alternatively, a filter could be used identifying a particular core or socket number.) The host hardware monitors the processor core temperature and whenever the core temperature crosses the threshold, it sends the notification to the telemetry queue number.

Upon completion of processing the queue command, a fifth operation is performed under which a completion queue entry is input to completion queue 606 at a slot currently pointed to by tail pointer 616 and the tail pointer is advanced one slot. Generally, the completion queue entry may include one or more of data identifying the queue command that has been completed, the telemetry data generated and/or collected via processing of the queue command, or a pointer to such telemetry data. Following this, in one embodiment an interrupt is generated during a sixth operation to inform a consumer that new telemetry data is available. Optionally, under a pull model, the consumer(s) will periodically pull telemetry data in response to either polling or doorbell rings. During a seventh operation, the location of head pointer 614 is read, and head pointer 614 is advanced one slot. A doorbell ring identifying the new head is then submitted to the consumer, as indicated by a completion queue head doorbell 620.

In the illustrated embodiment, BMC/IE 605 is the consumer of the telemetry data but, as before, this is merely exemplary and non-limiting as other entities on the host or in communication with the host may be consumers of the telemetry data. Under various approaches, the submission and completion queue model may either place the telemetry data that is generated in a location that is accessible to the consumer, or let an applicable consumer know the telemetry data is available via a doorbell ring or interrupt. Under this latter scheme, the consumer might either know in advance where the telemetry data is (so it can retrieve the data from that location), or a completion queue entry may contain information identifying the location of the telemetry data to retrieve.

As will be recognized by those skilled in the art, the submission of queue commands and processing of the queue commands is generally asynchronous, wherein tail pointer 612 for submission queue 604 will be "ahead" of head pointer 610 if there is any outstanding work (command processing) to do. Similarly, head pointer 614 will be "ahead" of tail pointer 616 for any processes that haven't been completed. Moreover, those skilled in the art will recognize that the data in a circular FIFO slots may be implemented as pointers that point to data that is stored separate from the queues themselves.

FIG. 7 shows a flowchart 700 used to set up a submission queue and completion queue model, according to one embodiment. In a block 702, the telemetry data sources to be used as data providers are identified. For example, in one embodiment the telemetry data sources are determined in advance based on a known host configuration. In another embodiment, all or a portion of the telemetry data sources may be determined dynamically, such as part of initializing the host. In a block 704, one or more telemetry data consumers are identified. The submission and completion queues are then set up, as depicted by completion a block 706.

In an optional block 806, the telemetry data providers are instructed where to submit their telemetry data (for use with a push model, as described below). As discussed above, in some embodiments the telemetry data providers include information in the completion queue entries identifying where their telemetry data is located, or otherwise the consumer will know in advance where the telemetry data is to be read or "pulled" from.

Figure 8:
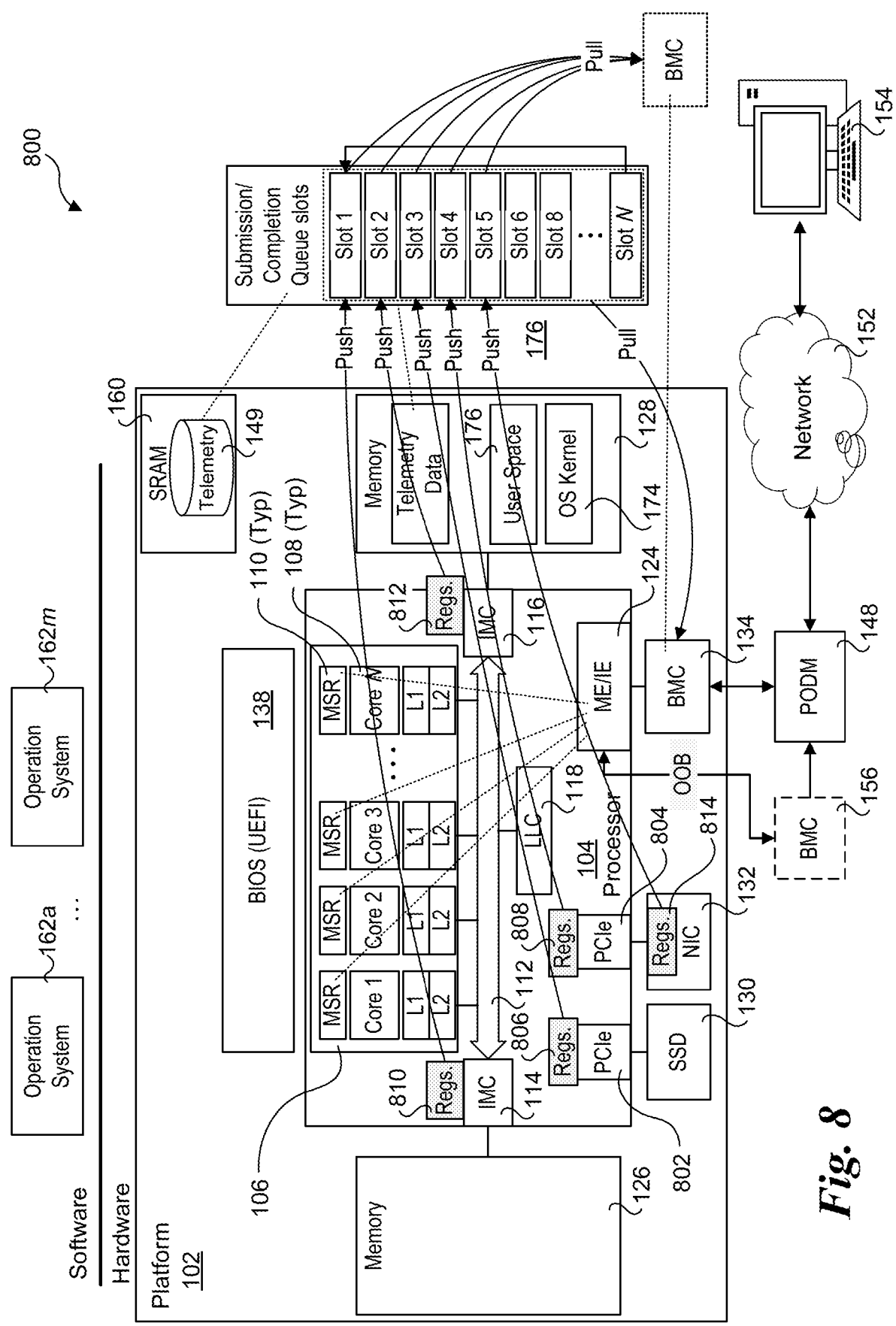
FIG. 8 is a schematic diagram of a platform architecture for implementing a first push-based scheme for collecting telemetry data from multiple telemetry data providers using the submission and completion queue model of FIG. 6, according to one embodiment.

FIG. 8 shows an architecture 800 illustrating an exemplary implementation of the submission and completion queue model as applied to collection of processor telemetry data by a BMC. In addition to components of compute platform 102 with like reference number previously discussed, compute platform 102 further includes PCIe (Peripheral Component Interconnect Express) interfaces 802 and 804 with respective registers 806 and 808. IMC 114 is further shown with registers 810, while IMC 116 further includes registers 812. NIC 132 is further shown with registers 814.

Under a conventional approach, BMC would read the values from each of registers 806, 808, 810, 812, and 814, generally on a periodic basis, along with reading other registers (not shown). In contrast, under the illustrated embodiment, there is logic on the compute platform, such as in the IMCs and PCIe interfaces that pushes (i.e., writes) corresponding telemetry data stored in registers 806, 808, 810, 812, and 814 into SRAM 149, memory address space 128, and/or other registers (not shown), as depicted by "Push" operations. When new data is written to a completion queue slot, the queue completion doorbell is rung. In response, BMC/IE 605, operating as a consumer, reads the data that has been written to the slots, as depicted by "Pull" operations. In one embodiment, the telemetry providers send their data to a predetermined address and logic associated with where the telemetry data is to be stored or buffered writes the data at locations that are identified by entries in the completion queue or otherwise a predetermined locations that are known to the consumer(s) of the telemetry data.

In another embodiment, the consumer pulls the telemetry data from locations (e.g., memory addresses) identified by pointers in the completion queue entries. For example, the consumer would read a completion queue entry comprising a pointer, and read (pull) telemetry data pointed to by the pointer.

Figure 8A:
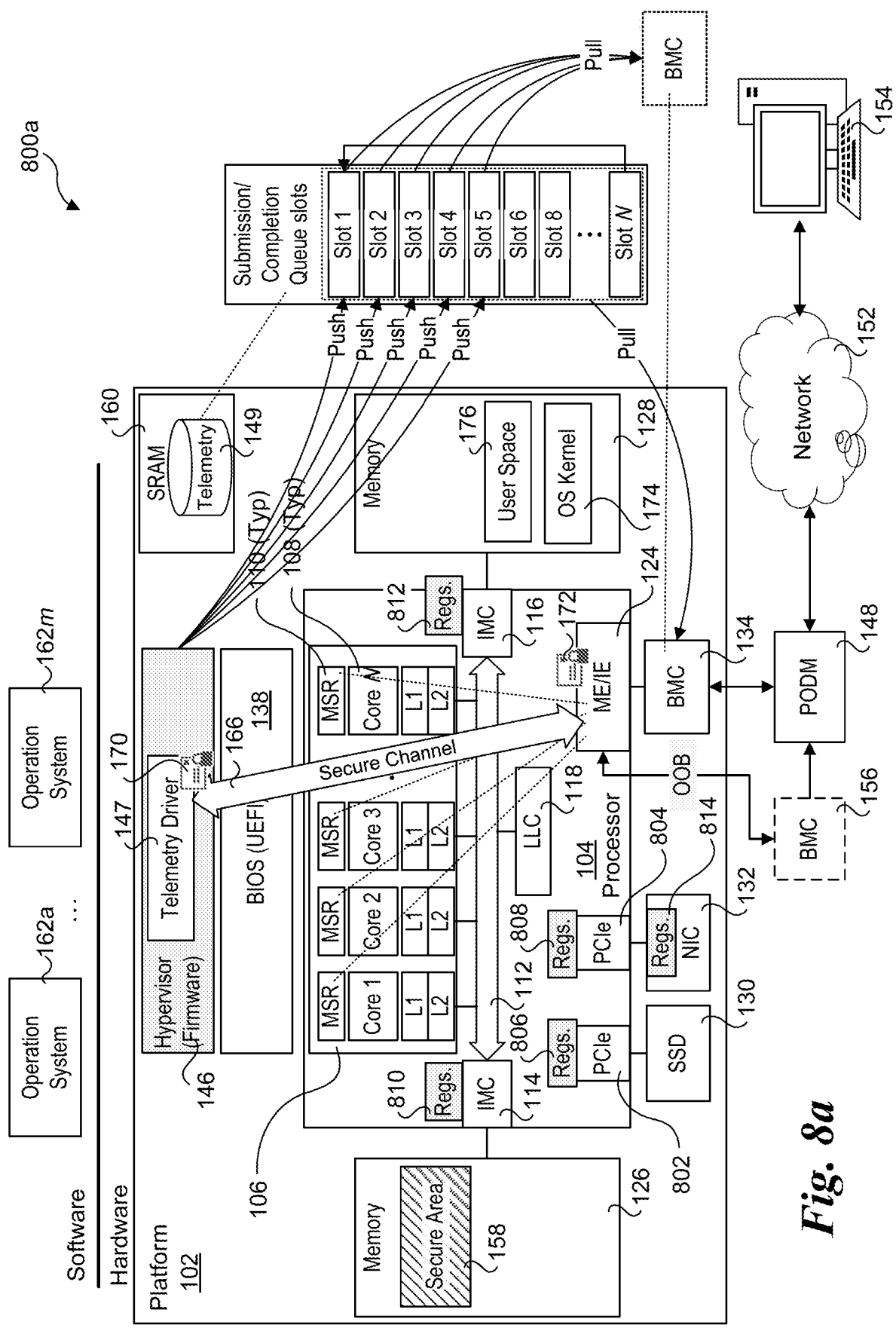
FIG. 8a is a schematic diagram of a platform architecture for implementing a second push-based scheme for collecting telemetry data from multiple telemetry data providers using the submission and completion queue model of FIG. 6, wherein the telemetry data is collected by a telemetry driver and then pushed to the completion queue, according to one embodiment.

FIG. 8a shows and architecture 800a under which data collected by telemetry driver 147 is pushed into submission queue slots in SRAM 149, and the telemetry data is subsequently pulled in response to completion queue doorbell rings by BMC/IE 605. This embodiment generally operates in a similar manner to the embodiment of FIG. 8, except in this case telemetry driver 147 collects the data and then pushes it into the completion queue slots rather than logic associated with registers 806, 808, 810, 812, and 814. It is noted that the code for telemetry driver 147 is still located in secure area 158, while the telemetry data 149 is stored into SRAM 149. One reason for this is in one embodiment secure area 158 is configured such that only hypervisor firmware 146 is permitted to access secure area 158. Thus, in order for firmware or software this is run from a memory location that is external to secure area 158, the telemetry data has to be stored elsewhere external to secure area 158, as well. By storing the data in SRAM 160, the telemetry data is still inaccessible to software running on the compute platform, since the existence or availability of SRAM 160 is never exposed to any software, nor is it a part of memory address space 126 or 128.

In addition to the single submission and completion queues shown in FIG. 6 and described above, multiple submission and/or completion queues may be used. For example, a first queue (telemetry selection queue) may be used for the BMC or IE to tell the host about which telemetry items it would like to access, while a second queue (telemetry data queue) may be employed for the host to stream the telemetry data based on the telemetry items selected in another queue. In the first queue, the submission queue door bell is rung by the BME/IE and consumed by the host hardware and the response queue door bell is rung by host hardware and consumed by the BMC/IE.

In the second queue, there is no command submission queue, only a completion queue, where the host hardware submits the telemetry data, which is retrieved by the BMC/IE. The doorbell is rung by the how hardware whenever it submits new data, which in one embodiment would cause an interrupt to the BMC/IE (if enabled by the BMC/IE).

FIG. 6 shows BMC/IE 605 reading the telemetry data. In another embodiment, the submission queue indicates which telemetry data to be enabled or read and the actual result could be available on another telemetry queue where the host hardware streams the telemetry data based on the condition specified in the telemetry enabling queue.

Memory Aliasing for Processor Telemetry Registers for IE/BMC Access

In current implementations, the communications between the host and the management controllers are very slow. Hence utilizing the management controller for offloading host functionality is very difficult. Under the following embodiments, a mechanism is implemented that uses one or more Memory Mapped Input-Output (MMIO) memory regions to alias the access to the management controller memory area. Under this approach, various mechanisms are used to access telemetry data and write the telemetry data to the MMIO regions such that the telemetry data appears to the management controller as part of its on-board memory, enabling the management controller to directly access the telemetry data.

Figure 9:
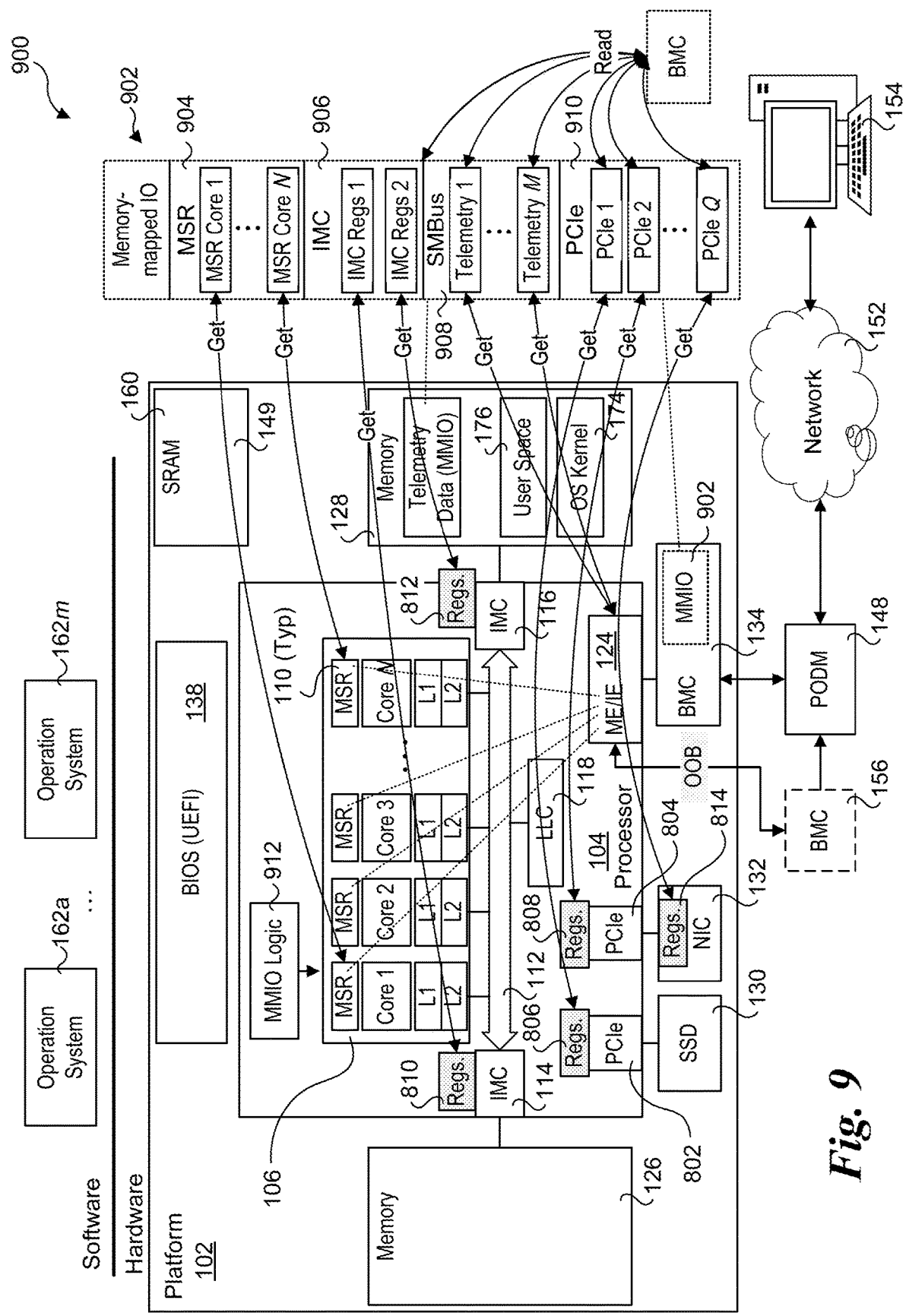
FIG. 9 is a schematic diagram of a platform architecture for implementing a memory-mapped input-output (MMIO) aliasing scheme under which telemetry data is accessed via MMIO addresses in a baseboard management controller.

FIG. 9 shows an architecture 900 used to implement one embodiment of a MMIO aliasing scheme. A MMIO region of memory 902 is partitioned into multiple address range, with each range associated with a corresponding access mechanism. In the illustrated example, these include an MSR range 904, an IMC range 906, a System Management Bus (SMBus) range 908, and a PCIe range 910. Architecture 900 further includes an MMIO logic block 912 that is used, in part, to effect the MMIO operations. To avoid clutter, MMIO logic block 912 is depicted at the top of processor 104 in FIG. 9; however, it is part of the uncore and is coupled to an IO interconnect on processor 104, such as, but not limited to a PCIe interconnect or a Universal Path Interconnect (UPI), thereby enabling MMIO logic block 912 to communicate with other components on compute platform 102.

Each of the ranges employ an associated access mechanism for access to data within that range. For example, MSR range 904 is depicted as including addresses labeled as MSR Core 1 . . . MSR Core N. Similarly, IMC range 906 is depicted as including addresses labeled as IMC Regs 1 and IMC Regs 2, while SMBus range 908 is depicted as including addresses labeled as Telemetry 1 . . . Telemetry M, and PCIe range 910 is depicted as including addresses labeled with PCIe 1, PCIe 2 . . . PCIe Q. Generally, the MMIO address ranges are part of the management controller's on-board memory address space, or otherwise memory address space that is on-board the platform and accessible to the management controller.

Figure 10:
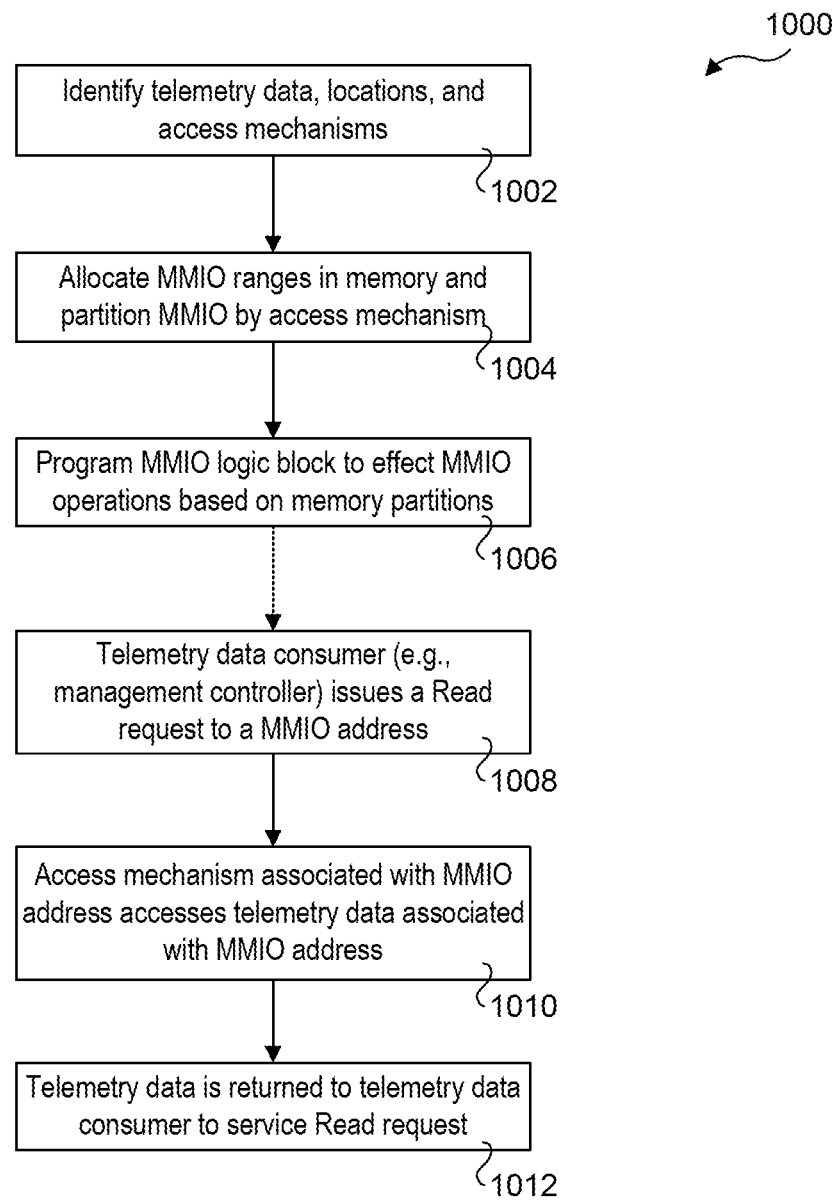
FIG. 10 is a flowchart illustrating operations for collecting telemetry data using the MMIO aliasing scheme of FIG. 9, according to one embodiment.

Flowchart 1000 in FIG. 10 illustrates operations for configuring MMIO accesses and subsequently performing ongoing operations that enable a telemetry consumer, such as a management controller, to access telemetry data by simply issuing read requests to MMIO addresses. The configuration operations are shown in blocks 1002, 1004, and 1006, while the ongoing operations are shown in blocks 1008, 1010, and 1012. Generally, the configuration operations may be performed during system initialization or during runtime. The ongoing operations are performed during runtime.

In a block 1002 the telemetry data, locations, and access mechanisms are identified. In the example shown in FIG. 9 these include the MSRs 110 associated with processor cores 1-N, IMC registers 810 and 812, PCIe registers 806, 808, and 814, and various telemetry data relating to SMBus operations (not shown). Each of these have different types of access mechanism, which are also identified. For example, in one embodiment access to MSRs 110 is through ME/IE 124. Accordingly, MMIO logic 912 builds an access record that defines the access mechanism for MSRs 100 through ME/IE 124, and ME/IE 124 is configured to implement the access mechanisms. IMC registers 810 and 812 can be accessed via IMC 114 and 116, respectively. PCIe registers 806, 808, and 814 may be accessed over PCIe infrastructure. The SMBus data may be accessed via processor mechanisms to access the SMBus (not shown).

In a block 1004 the MMIO ranges in the MMIO memory region are allocated and the MMIO memory region is partitioned by access mechanism. Partitioning the MMIO region by access mechanism simplifies the information used for effecting the MMIO operations, as rather than have an access mechanism identified by telemetry data source MMIO address, ranges of address can share the same access mechanism via corresponding address range mapping information.

In a block 1006, the MMIO logic block is programmed to effect MMIO operations based on the MMIO memory partitions. This may further involve creating a mapping record that maps a given MMIO memory address to its location as defined through its access mechanism. For example, PCIe components are enumerated during system boot, such that each PCI component, including its registers, has a unique address within the PCIe hierarchy.

Once the configuration operations in blocks 1002, 1004, and 1006 have been completed, ongoing runtime operations may be performed to enable a telemetry data consumer, such as a management controller (e.g., a BMC) to access telemetry data by simply reading it own on-board memory.

In block 1008, the telemetry data consumer issues a read request to a MMIO address via which particular telemetry data is accessed. In block 1010, the access mechanism associated with the telemetry data is used to access the telemetry data, resulting in the telemetry data being placed in the MMIO address corresponding to the consumer's Read request. The telemetry data is then returned to the telemetry data consumer in block 1012 to service the Read request.

Returning to FIG. 9, accesses to the various telemetry data sources are illustrated using double-headed "Get" arrows. These are used to logically depict what data is returned to which MMIO address. As discussed above, this is effected via the appropriate access mechanism. For the following discussion, presume that BMC 134 is either connected to ME/IE 124 or processor 104 via a PCIe link, and the ME/IE 124 is connected internally to coherent interconnect 112, which is a UPI interconnect in one embodiment.

We will start with the PCIe telemetry data. BMC 134 issues a Read request to the memory address labeled as PCIe 1 in PCIe range 910 of MMIO 902. In response to the Read request at this access, logic has been programmed (during the foregoing configuration operations) to cause data to be retrieved from PCIe registers 806. If BMC 134 is connected to processor 104 via a PCIe interconnect (but not connected to ME/IE 124), this data is physically accessed over PCIe interconnect infrastructure and returned to address PCIe 1, at which point the telemetry data in PCIe registers 806 is returned to BMC 134 to service the Read request. If BMC 134 is connected to ME/IE 124, ME/IE 124 will access the data via a UPI-to-PCIe bridge (not shown).

A similar sequence is used to access each of the MSR, IMC, and SMBus telemetry data; however, the access mechanism are different, as none of the telemetry data sources is directly coupled to the PCIe interconnect infrastructure. In implementations under which BMC 134 is connected to ME/IE 124, ME/IE 124 can access each of IMC registers 810 and 812 via coherent interconnect 112. Likewise, MSRs 110 may be accessed via coherent interconnect 112. (It is noted that the coherency aspect of coherent interconnect 112 is not used for these purposes, as cache and home agents used to support memory coherency are not used.) For accessing MSRs 110 and/or the SMBus telemetry data, processor 104 may need to first be put into System Management Mode (SMM). Thus, the access mechanisms to access these telemetry data would invoke an SMM interrupt, and an appropriate SMM interrupt service routine (ISR) would be used to retrieve the data. Such SMM ISRs would generally be implemented as part of BIOS 138.

In addition to the embodiments illustrated the foregoing Figures, aspects of these embodiments may be combined to collect telemetry data. For example, the producer-consumer submission-completion queue model could be applied to either of the firmware-based architectures of FIGS. 1, 1*a*, and 2*a*-2*d*, or the MMIO architecture of FIG. 9, in addition to architectures 800 and 800*a* shown in FIGS. 8 and 8*a*.

As used herein, including the following claims, software and firmware are distinct types of code and/or instructions. Generally, firmware components may comprises code or instructions that are part of the platform firmware (such as part of the UEFI firmware code). The platform firmware is generally loaded and/or configured for execution during platform hardware initialization. Conversely, software includes code or instructions that are executed following platform hardware initialization, such as but not limited to operating system components, any application software running on an operating system, the software portion of a hypervisor or OS virtualization layer, and software code for implementing a virtual machine or container hosted by a hypervisor or OS virtualization layer.

Further aspects of the subject matter described herein are set out in the following numbered clauses:

1. A method comprising:
implementing a trusted telemetry mechanism for securely collecting platform telemetry data from a plurality of telemetry data sources on a compute platform;
collecting telemetry data from the plurality of telemetry data sources; and
securely storing the telemetry data that is collected, wherein the trusted telemetry mechanism is inaccessible to software running on the compute platform and the telemetry data is securely stored in a manner that is inaccessible to software running on the compute platform.

2. The method of clause 1, wherein the compute platform includes a plurality of firmware components, and wherein the trusted telemetry mechanism includes at least one of the plurality of firmware components.

3. The method of clause 2, wherein the firmware includes a telemetry driver that is part of a Universal Extensible Firmware Interface (UEFI) firmware component.

4. The method of clause 2 or 3, wherein the compute platform includes system memory and the at least one of the plurality of firmware components includes a telemetry driver, further comprising:
implementing a secure area in the system memory that is not accessible to software running on the compute platform; and
loading the telemetry driver into the secure area of the system memory.

5. The method of clause 4, further comprising storing telemetry data collected by the telemetry driver in the secure area in the system memory.

6. The method of clause 4 or 5, further comprising storing telemetry data collected by the telemetry driver in the secure area in at least one of Static Random Access Memory (SRAM) and a plurality of registers on the compute platform.

7. The method of any of clauses 4-6, wherein the compute platform includes a processor with a plurality of machine specific registers (MSRs) and a manageability component that is enabled to access the plurality of MSRs, further comprising:
creating a secure communication channel between the telemetry driver and the manageability entity;
collecting telemetry data from the plurality of MSRs via the manageability entity; and
transferring the telemetry data to the telemetry driver over the secure communication channel.

8. The method of any of the preceding clauses, wherein the compute platform includes a processor with a plurality of machine specific registers (MSRs) and includes a plurality of components with respective sets of one or more component registers, further comprising:
collecting telemetry data from at least one MSR; and
collecting telemetry data from at least one component register.

9. The method of any of the preceding clauses, further comprising:
implementing a submission queue and a completion queue to facilitate collection of at least a portion of the telemetry data.

10. The method of clause 9, further comprising:
identifying a plurality of telemetry data sources in the compute platform;
submitting a queue command to a slot in the submission queue, the queue command identify telemetry data that is to be at least one of generated and forwarded by one of the telemetry data providers;
fetching the queue command from the submission queue;
processing the queue command to at least one of generate and forward telemetry data identified by the queue command;
inputting a process completion entry into a slot in the completion queue, the process completion entry including at least one of data identifying the queue command that was processed, the telemetry data, and a location of the telemetry data;
accessing the telemetry data using data contained in the process completion queue entry; and
securely storing the telemetry data.

11. The method of any of the preceding clauses, further comprising:
implementing a memory-mapped input-output (MMIO) alias for each of a plurality of telemetry data sources in the compute platform, each MMIO alias mapping a telemetry data source to a corresponding address in memory on the compute platform that is inaccessible to software running on the compute platform;
receiving a memory read request including an memory address to access the memory;
employing a telemetry data access mechanism associated with the memory address to cause telemetry data provided by the telemetry data source corresponding to the MMIO alias for the memory address to be placed in the memory at a location defined by the memory address; and
returning the telemetry data to service the read request.

12. The method of clause 11, further comprising:
partitioning the memory into a plurality of regions;
associating a telemetry data access mechanism with each of the plurality regions;
in response to receiving the memory read request, identifying the region in which the memory address is located; and
employing the access telemetry data access mechanism associated with the region that is identified to access the telemetry data source.

13. A compute platform, comprising:
a processor including at least one memory controller;
one or more memory devices, each coupled to a memory controller in the processor;
platform firmware, including and one or more telemetry firmware components to facilitate collection of platform telemetry data;
wherein the platform firmware is configured, upon execution by the processor, to, configure a portion of memory in a memory device as a secure memory area;
load the one or more firmware components to facilitate collection of platform telemetry data into the secure memory area;
execute the one or more telemetry firmware components in the secure memory area to collect platform telemetry data.

14. The compute platform of clause 13, further comprising:
software, stored on the compute platform, configured to be executed by the processor,
wherein execution of the platform firmware causes the compute platform to configure at least one virtual memory space allocated for execution of the software, and wherein the software is prevented from accessing the secure area of memory.

15. The compute platform of clause 13 or 14, wherein the platform firmware comprises includes a telemetry driver that is part of Universal Extensible Firmware Interface (UEFI) firmware.

16. The compute platform of any of clauses 13-15, wherein the telemetry firmware is further configured, upon execution, to store at least a portion of the telemetry data that is collected in the secure memory area.

17. The compute platform of any of clauses 13-16, wherein the telemetry firmware is further configured, upon execution, to store at least a portion of the telemetry data in at least one of Static Random Access Memory (SRAM) and a plurality of registers on the compute platform.

18. The compute platform of any of clauses 13-17, wherein the telemetry firmware includes a telemetry driver, wherein the processor includes a plurality of machine specific registers (MSRs) and a manageability component that is enabled to access the plurality of MSRs, and wherein the platform firmware is further configured, upon execution, to:

create a secure communication channel between the telemetry driver and the manageability entity;

collect telemetry data from the plurality of MSRs via the manageability entity; and transfer the telemetry data to the telemetry driver over the secure communication channel.

19. The compute platform of any of clauses 13-18, wherein the platform firmware is further configured, upon execution, to implement a submission queue and a completion queue to facilitate collection of at least a portion of the telemetry data.

20. The compute platform of clause 19, wherein the platform firmware is further configured, upon execution, to:

identify a plurality of telemetry data sources in the compute platform;

submit a queue command to a slot in the submission queue, the queue command identify telemetry data that is to be at least one of generated and forwarded by one of the telemetry data providers;

fetch the queue command from the submission queue;

process the queue command to at least one of generate and forward telemetry data identified by the queue command;

input a process completion entry into a slot in the completion queue, the process completion entry including at least one of data identifying the queue command that was processed, the telemetry data, and a location of the telemetry data;

access the telemetry data using data contained in the process completion queue entry; and securely store the telemetry data on the compute platform.

21. The compute platform of any of clauses 13-20, wherein the compute platform includes a management controller having on-board memory, and the platform firmware is further configured, upon execution, to:

implement a memory-mapped input-output (MMIO) alias for each of a plurality of telemetry data sources in the compute platform, each MMIO alias mapping a telemetry data source to a corresponding address in the on-board memory of the management controller;

receive a memory read request including a memory address to access the on-board memory of the management controller;

employ a telemetry data access mechanism associated with the memory address to cause telemetry data provided by the telemetry data source corresponding to the MMIO alias for the memory address to be placed in the on-board memory at a location defined by the memory address; and return the telemetry data to service the read request.

22. The compute platform of clause 21, further comprising:

partition the on-board memory into a plurality of regions;

associate a telemetry data access mechanism with each of the plurality regions;

in response to receiving the memory read request, identify the region in which the memory address is located; and employ the access telemetry data access mechanism associated with the region that is identified to access the telemetry data source.

23. A non-transitory machine-readable medium having firmware instructions including one or more telemetry firmware components stored thereon configured to be executed by a processor in a compute platform including system memory, wherein the firmware instructions, when executed, enable the compute platform to:

configure a portion of system memory as a secure memory area;

load one or more telemetry firmware components into the secure memory area;

execute the one or more telemetry firmware components in the secure memory area to collect platform telemetry data.

24. The non-transitory machine-readable medium of clause 23, further comprising:

software, stored on the compute platform, configured to be executed by the processor, wherein execution of the firmware instructions causes the compute platform to configure at least one virtual memory space allocated for execution of the software, and wherein the software is prevented from accessing the secure area of memory.

25. The non-transitory machine-readable medium of clause 23 or 24, wherein the one or more telemetry firmware components includes a telemetry driver that is part of Universal Extensible Firmware Interface (UEFI) firmware.

26. The non-transitory machine-readable medium of any of clauses 23-25, wherein the firmware instructions are further configured, upon execution, to store at least a portion of the telemetry data that is collected in the secure memory area.

27. The non-transitory machine-readable medium of any of clauses 23-26, wherein the firmware instructions are further configured, upon execution, to store at least a portion of the telemetry data that is collected in at least one of Static Random Access Memory (SRAM) and a plurality of registers on the compute platform.

28. The non-transitory machine-readable medium of any of clauses 23-27, wherein the one or more telemetry firmware components includes a telemetry driver, wherein the processor includes a plurality of machine specific registers (MSRs) and a manageability component that is enabled to access the plurality of MSRs, and wherein the firmware instructions are further configured, upon execution, to:

create a secure communication channel between the telemetry driver and the manageability entity;

collect telemetry data from the plurality of MSRs via the manageability entity; and transfer the telemetry data to the telemetry driver over the secure communication channel.

29. The non-transitory machine-readable medium of any of clauses 23-28, wherein the firmware instruction are further configured, upon execution, to implement a submission queue and a completion queue to facilitate collection of at least a portion of the telemetry data.

30. The non-transitory machine-readable medium of clause 29, wherein the firmware instructions are further configured, upon execution, to:

identify a plurality of telemetry data sources in the compute platform;

submit a queue command to a slot in the submission queue, the queue command identify telemetry data that is to be at least one of generated and forwarded by one of the telemetry data providers;

fetch the queue command from the submission queue;

process the queue command to at least one of generate and forward telemetry data identified by the queue command;

input a process completion entry into a slot in the completion queue, the process completion entry including at least one of data identifying the queue command that was processed, the telemetry data, and a location of the telemetry data; and access the telemetry data using data contained in the process completion queue entry; and securely store the telemetry data on the compute platform.

31. A method, comprising:

identifying a plurality of telemetry data sources in a compute platform;

submitting a queue command to a slot in a submission queue, the queue command identify telemetry data that is to be at least one of generated and forwarded by one of the telemetry data providers;

fetching the queue command from the submission queue;

processing the queue command to at least one of generate and forward telemetry data identified by the queue command;

inputting a process completion entry into a slot in a completion queue, the process completion entry including at least one of the queue command that was processed, the telemetry data, and a location of the telemetry data; and accessing the telemetry data via a telemetry data consumer.

32. The method of clause 31, further comprising implementing each of the submission queue and completion queues as circular queues including a head pointer and tail pointer.

33. The method of clause 31 or 32, further comprising ringing a submission queue doorbell when the queue command is submitted to the submission queue.

34. The method of any of clauses 31-33, further comprising ringing a completion queue doorbell when a process completion entry is input to the completion queue.

35. The method of any of clauses 31-34, wherein the queue command is submitted by a management controller that is one of included on the compute platform or in communication with the compute platform.

36. The method of any of clauses 31-35, wherein the telemetry data consumer comprises a management controller that is one of included on the compute platform or in communication with the compute platform.

37. The method of any of clauses 31-36, further comprising:

generating an interrupt when a completion queue entry is input to the completion queue; and performing an interrupt service routine in response to the interrupt, the interrupt service routine used to at least one of access and forward telemetry data associated with the completion queue entry.

38. The method of any of clauses 31-37, wherein processing the queue command pushes telemetry data into the slot in the completion queue.

39. The method of any of clauses 31-38, wherein the compute platform includes a processor with a plurality of machine specific registers (MSRs), and processing the queue command is performed, at least in part, via a trusted firmware-based telemetry driver that is implemented to access telemetry data in an MSR and push the telemetry data into the slot in the completion queue.

40. The method of any of clauses 31-39, wherein the telemetry data consumer accesses the telemetry data by one of reading the telemetry data from the slot in the completion queue and reading the telemetry data from a location identified by data in the slot in the completion queue.

41. A compute platform, comprising:

a processor including at least one memory controller;

one or more memory devices, each coupled to a memory controller in the processor;

the compute platform to, identify a plurality of telemetry data sources in the compute platform;

submit a queue command to a slot in a submission queue, the queue command identify telemetry data that is to be at least one of generated and forwarded by one of the telemetry data providers;

fetch the queue command from the submission queue;

process the queue command to at least one of generate and forward telemetry data identified by the queue command;

input a process completion entry into a slot in a completion queue, the process completion entry including at least one of the queue command that was processed, the telemetry data, and a location of the telemetry data; and enable access the telemetry data via a telemetry data consumer.

42. The compute platform of clause 41, wherein the compute platform is further to implementing each of the submission queue and completion queues as circular queues including a head pointer and tail pointer.

43. The compute platform of clause 41 or 42, wherein the compute platform is further to ring a submission queue doorbell when the queue command is submitted to the submission queue.

44. The compute platform of any of clauses 41-43, wherein the compute platform is further to ring a completion queue doorbell when a process completion entry is input to the completion queue.

45. The compute platform of any of clauses 41-44, wherein the queue command is submitted by a management controller that is one of included on the compute platform or in communication with the compute platform.

46. The compute platform of any of clauses 41-45, wherein the telemetry data consumer comprises a management controller that is one of included on the compute platform or in communication with the compute platform.

47. The compute platform of any of clauses 41-46, wherein the compute platform is further to:

generate an interrupt when a completion queue entry is input to the completion queue; and perform an interrupt service routine in response to the interrupt, the interrupt service routine used to at least one of access and forward telemetry data associated with the completion queue entry.

48. The compute platform of any of clauses 41-47, wherein processing the queue command pushes telemetry data into the slot in the completion queue.

49. The compute platform of any of clauses 41-48, wherein the processor includes a plurality of machine specific registers (MSRs), and processing the queue command is performed, at least in part, via a trusted firmware-based telemetry driver that is implemented to access telemetry data in an MSR and push the telemetry data into the slot in the completion queue.

50. The method of any of clauses 41-49, wherein the telemetry data consumer is enabled to access the telemetry data by one of reading the telemetry data from the slot in the completion queue and reading the telemetry data from a location identified by data in the slot in the completion queue.

51. A non-transitory machine-readable medium having instructions stored thereon configured to be executed by one or more processing elements in a compute platform including at least one memory device, wherein the instructions, when executed, enable the compute platform to perform the method of any of clauses 31-40.

52. A method comprising:
implementing a memory-mapped input-output (MMIO) alias for each of a plurality of telemetry data sources in a compute platform, each MMIO alias mapping a telemetry data source to an corresponding address in memory on the compute platform;
receiving a memory read request including an address to access the memory;
employing a telemetry data access mechanism associated with the memory address to cause telemetry data provided by the telemetry data source corresponding to the MMIO alias for the memory address to be placed in the memory address; and
returning the telemetry data to service the read request.

53. The method of clause 52, wherein the memory is in a management controller on the compute platform.

54. The method of clause 52 or 53, further comprising:
partitioning the memory into a plurality of regions;
associating a telemetry data access mechanism with each of the plurality regions;
in response to receiving the memory read request,
identifying the region in which the memory address is located; and
employing the access telemetry data access mechanism associated with the region that is identified to access the telemetry data source.

55. The method of any of clauses 52-54, wherein the compute platform includes a processor with a plurality of machine specific registers (MSRs), and wherein the telemetry data access mechanism accesses a telemetry data source comprising an MSR.

56. The method of any of clauses 52-55, wherein the compute platform includes a processor with at least one memory controller, each memory controller having at least one associated register, and wherein the telemetry data access mechanism accesses a register associated with a memory controller.

57. The method of any of clauses 52-56, wherein the compute platform includes a processor with a system management bus (SMBus), and wherein the telemetry data access mechanism accesses telemetry data generated by a telemetry data source accessed via the SMBus.

58. The method of any of clauses 52-57, wherein the telemetry data is accessed via the SMBus by:
invoking a System Manage Mode (SMM) interrupt;
putting the processor into SMM in response to the SMM interrupt;
performing an SMM interrupt service routine (ISR) to service the SMM interrupt, the SMM ISR returning telemetry data accessed from the telemetry data source via the SMBus.

59. The method of any of clauses 52-57, wherein the compute platform includes a plurality of Peripheral Component Interconnect Express (PCIe) devices, each having one or more associated registers, and whether the telemetry data access mechanism accesses telemetry data in a PCIe device register.

60. A compute platform, comprising:
a processor including at least one memory controller;
one or more memory devices, each coupled to a memory controller in the processor;
the compute platform to,
implement a memory-mapped input-output (MMIO) alias for each of a plurality of telemetry data sources in a compute platform, each MMIO alias mapping a telemetry data source to an corresponding address in memory on the compute platform;
receive a memory read request including an address to access the memory;
employ a telemetry data access mechanism associated with the memory address to cause telemetry data provided by the telemetry data source corresponding to the MMIO alias for the memory address to be placed in the memory address; and return the telemetry data to service the read request.

61. The compute platform of clause 60, wherein the compute platform further includes a management controller with on-board memory, and the MMIO aliases are mapped to the on-board memory in the management controller.

62. The compute platform of clause 60 or 61, wherein the compute platform is further to:
partition the memory into a plurality of regions;
associate a telemetry data access mechanism with each of the plurality regions;
in response to receiving the memory read request,
identify the region in which the memory address is located; and
employ the access telemetry data access mechanism associated with the region that is identified to access the telemetry data source.

63. The compute platform of any of clauses 60-63, wherein the processor includes a plurality of machine specific registers (MSRs), and wherein the telemetry data access mechanism accesses a telemetry data source comprising an MSR.

64. The compute platform of any of clauses 60-63, wherein each memory controller has at least one associated register, and wherein the telemetry data access mechanism accesses a register associated with a memory controller.

65. The compute platform of any of clauses 60-64, wherein the compute platform includes a processor with a system management bus (SMBus), and wherein the telemetry data access mechanism accesses telemetry data generated by a telemetry data source accessed via the SMBus.

66. The compute platform of any of clauses 60-65, wherein the telemetry data is accessed via the SMBus by:
invoking a System Manage Mode (SMM) interrupt;
putting the processor into SMM in response to the SMM interrupt;
performing an SMM interrupt service routine (ISR) to service the SMM interrupt, the SMM ISR returning telemetry data accessed from the telemetry data source via the SMBus.

67. The compute platform of any of clauses 60-66, wherein the compute platform includes a plurality of Peripheral Component Interconnect Express (PCIe) devices, each having one or more associated registers, and whether the telemetry data access mechanism accesses telemetry data in a PCIe device register.

68. A non-transitory machine-readable medium having instructions stored thereon configured to be executed by one or more processing elements in a compute platform including at least one memory device, wherein the instructions, when executed, enable the compute platform to perform the method of any of clauses 52-59.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'm', 'n' M', 'N', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding firmware components, such as firmware code or instructions executed by a processor or the like. Portions of firmware may also be executed on an embedded processor or the like. Thus, embodiments of this invention may be used as or to support firmware components, modules, code and/or instructions executed upon some form of processor, processing core or embedded processor or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored firmware code and/or instructions may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including a non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
implementing a trusted telemetry mechanism for securely collecting platform telemetry data from a plurality of telemetry data sources on a compute platform;
collecting telemetry data from the plurality of telemetry data sources; and
securely storing the telemetry data that is collected,
wherein the trusted telemetry mechanism is inaccessible to software running on the compute platform and the telemetry data is securely stored in a manner that is inaccessible to software running on the compute platform,
wherein the compute platform includes a plurality of firmware components, and wherein the trusted telemetry mechanism includes at least one of the plurality of firmware components.

2. The method of claim 1, wherein the firmware includes a telemetry driver that is part of a Universal Extensible Firmware Interface (UEFI) firmware component.

3. The method of claim 1, wherein the platform includes system memory and the at least one of the plurality of firmware components includes a telemetry driver, further comprising: implementing a secure area in the system memory that is not accessible to software running on the compute platform; and loading the telemetry driver into the secure area of the system memory.

4. The method of claim 3, further comprising storing telemetry data collected by the telemetry driver in the secure area in the system memory.

5. The method of claim 3, further comprising storing telemetry data collected by the telemetry driver in the secure area in at least one of Static Random Access Memory (SRAM) and a plurality of registers on the compute platform.

6. The method of claim 3, wherein the platform includes a processor with a plurality of machine specific registers (MSRs) and a manageability component that is enabled to access the plurality of MSRs, further comprising:
creating a secure communication channel between the telemetry driver and the manageability entity;
collecting telemetry data from the plurality of MSRs via the manageability entity; and
transferring the telemetry data to the telemetry driver over the secure communication channel.

7. The method of claim 1, wherein the platform includes a processor with a plurality of machine specific registers (MSRs) and includes a plurality of components with respective sets of one or more component registers, further comprising:
collecting telemetry data from at least one MSR; and
collecting telemetry data from at least one component register.

8. The method of claim 1, further comprising:
implementing a submission queue and a completion queue to facilitate collection of at least a portion of the telemetry data.

9. The method of claim 8, further comprising:
identifying a plurality of telemetry data sources in the compute platform;
submitting a queue command to a slot in the submission queue, the queue command identify telemetry data that is to be at least one of generated and forwarded by one of the telemetry data providers;
fetching the queue command from the submission queue;
processing the queue command to at least one of generate and forward telemetry data identified by the queue command;
inputting a process completion entry into a slot in the completion queue, the process completion entry including at least one of data identifying the queue command that was processed, the telemetry data, and a location of the telemetry data;
accessing the telemetry data using data contained in the process completion queue entry; and
securely storing the telemetry data.

10. The method of claim 1, further comprising:
implementing a memory-mapped input-output (MMIO) alias for each of a plurality of telemetry data sources in the compute platform, each MMIO alias mapping a telemetry data source to a corresponding address in memory on the compute platform that is inaccessible to software running on the compute platform;
receiving a memory read request including a memory address to access the memory;
employing a telemetry data access mechanism associated with the memory address to cause telemetry data provided by the telemetry data source corresponding to the MMIO alias for the memory address to be placed in the memory at a location defined by the memory address; and
returning the telemetry data to service the read request.

11. The method of claim 10, further comprising:
partitioning the memory into a plurality of regions;
associating a telemetry data access mechanism with each of the plurality regions;
in response to receiving the memory read request,
identifying the region in which the memory address is located; and
employing the access telemetry data access mechanism associated with the region that is identified to access the telemetry data source.

12. A compute platform, comprising:
a processor including at least one memory controller;
one or more memory devices, each coupled to a memory controller in the processor;
platform firmware, including and one or more telemetry firmware components to facilitate collection of platform telemetry data;
wherein the platform firmware is configured, upon execution by the processor, to,
configure a portion of memory in a memory device as a secure memory area;
load the one or more firmware components to facilitate collection of platform telemetry data into the secure memory area;
execute the one or more telemetry firmware components in the secure memory area to collect platform telemetry data.

13. The compute platform of claim 12, further comprising:
software, stored on the compute platform, configured to be executed by the processor,
wherein execution of the platform firmware causes the compute platform to configure at least one virtual memory space allocated for execution of the software, and wherein the software is prevented from accessing the secure area of memory.

14. The compute platform of claim 12, wherein the platform firmware comprises includes a telemetry driver that is part of Universal Extensible Firmware Interface (UEFI) firmware.

15. The compute platform of claim 12, wherein the telemetry firmware is further configured, upon execution, to store at least a portion of the telemetry data that is collected in the secure memory area.

16. The compute platform of claim 12, wherein the telemetry firmware is further configured, upon execution, to store at least a portion of the telemetry data in at least one of Static Random Access Memory (SRAM) and a plurality of registers on the compute platform.

17. The compute platform of claim 12, wherein the telemetry firmware includes a telemetry driver, wherein the processor includes a plurality of machine specific registers (MSRs) and a manageability component that is enabled to access the plurality of MSRs, and wherein the platform firmware is further configured, upon execution, to:
  create a secure communication channel between the telemetry driver and the manageability entity;
  collect telemetry data from the plurality of MSRs via the manageability entity; and
  transfer the telemetry data to the telemetry driver over the secure communication channel.

18. The compute platform of claim 12, wherein the platform firmware is further configured, upon execution, to implement a submission queue and a completion queue to facilitate collection of at least a portion of the telemetry data.

19. The compute platform of claim 18, wherein the platform firmware is further configured, upon execution, to:
  identify a plurality of telemetry data sources in the compute platform;
  submit a queue command to a slot in the submission queue, the queue command identify telemetry data that is to be at least one of generated and forwarded by one of the telemetry data providers;
  fetch the queue command from the submission queue;
  process the queue command to at least one of generate and forward telemetry data identified by the queue command;
  input a process completion entry into a slot in the completion queue, the process completion entry including at least one of data identifying the queue command that was processed, the telemetry data, and a location of the telemetry data;
  access the telemetry data using data contained in the process completion queue entry; and
  securely store the telemetry data on the compute platform.

20. The compute platform of claim 12, wherein the compute platform includes a management controller having on-board memory, and the platform firmware is further configured, upon execution, to:
  implement a memory-mapped input-output (MMIO) alias for each of a plurality of telemetry data sources in the compute platform, each MMIO alias mapping a telemetry data source to a corresponding address in the on-board memory of the management controller;
  receive a memory read request including a memory address to access the on-board memory of the management controller;
  employ a telemetry data access mechanism associated with the memory address to cause telemetry data provided by the telemetry data source corresponding to the MMIO alias for the memory address to be placed in the on-board memory at a location defined by the memory address; and
  return the telemetry data to service the read request.

21. The compute platform of claim 20, wherein the platform firmware is further configured, upon execution, to:
  partition the on-board memory into a plurality of regions;
  associate a telemetry data access mechanism with each of the plurality regions;
  in response to receiving the memory read request,
    identify the region in which the memory address is located; and
    employ the access telemetry data access mechanism associated with the region that is identified to the telemetry data source.

22. A non-transitory machine-readable medium having firmware instructions including one or more telemetry firmware components stored thereon configured to be executed by a processor in a compute platform including system memory, wherein the firmware instructions, when executed, enable the platform to:
  configure a portion of system memory as a secure memory area;
  load one or more telemetry firmware components into the secure memory area;
  execute the one or more telemetry firmware components in the secure memory area to collect platform telemetry data.

23. The non-transitory machine-readable medium of claim 22, further comprising:
  software, stored on the compute platform, configured to be executed by the processor,
  wherein execution of the firmware instructions causes the compute platform to configure at least one virtual memory space allocated for execution of the software, and wherein the software is prevented from accessing the secure area of memory.

24. The non-transitory machine-readable medium of claim 22, wherein the one or more telemetry firmware components includes a telemetry driver that is part of Universal Extensible Firmware Interface (UEFI) firmware.

25. The non-transitory machine-readable medium of claim 22, wherein the firmware instructions are further configured, upon execution, to store at least a portion of the telemetry data that is collected in the secure memory area.

26. The non-transitory machine-readable medium of claim 22, wherein the firmware instructions are further configured, upon execution, to store at least a portion of the telemetry data that is collected in at least one of Static Random Access Memory (SRAM) and a plurality of registers on the compute platform.

27. The non-transitory machine-readable medium of claim 22, wherein the one or more telemetry firmware components includes a telemetry driver, wherein the processor includes a plurality of machine specific registers (MSRs) and a manageability component that is enabled to access the plurality of MSRs, and wherein the firmware instructions are further configured, upon execution, to:
  create a secure communication channel between the telemetry driver and the manageability entity;
  collect telemetry data from the plurality of MSRs via the manageability entity; and
  transfer the telemetry data to the telemetry driver over the secure communication channel.

28. The non-transitory machine-readable medium of claim 22, wherein the firmware instruction are further configured, upon execution, to implement a submission queue and a completion queue to facilitate collection of at least a portion of the telemetry data.

29. The non-transitory machine-readable medium of claim 28, wherein the firmware instructions are further configured, upon execution, to:
identify a plurality of telemetry data sources in the compute platform;
submit a queue command to a slot in the submission queue, the queue command identify telemetry data that is to be at least one of generated and forwarded by one of the telemetry data providers;
fetch the queue command from the submission queue;
process the queue command to at least one of generate and forward telemetry data identified by the queue command;
input a process completion entry into a slot in the completion queue, the process completion entry including at least one of data identifying the queue command that was processed, the telemetry data, and a location of the telemetry data; and
access the telemetry data using data contained in the process completion queue entry; and
securely store the telemetry data on the compute platform.

* * * * *